US012362785B2

United States Patent
Kaya et al.

(10) Patent No.: US 12,362,785 B2
(45) Date of Patent: Jul. 15, 2025

(54) BEAM PREDICTION FOR WIRELESS NETWORKS

(71) Applicant: NOKIA TECHNOLOGIES OY, Espoo (FI)

(72) Inventors: Aliye Ozge Kaya, Chatham, NJ (US); Harish Viswanathan, Morristown, NJ (US)

(73) Assignee: Nokia Technologies Oy, Espoo (FI)

( * ) Notice: Subject to any disclaimer, the term of this patent is extended or adjusted under 35 U.S.C. 154(b) by 849 days.

(21) Appl. No.: 17/594,421

(22) PCT Filed: Apr. 17, 2019

(86) PCT No.: PCT/US2019/027998
§ 371 (c)(1),
(2) Date: Oct. 15, 2021

(87) PCT Pub. No.: WO2020/214168
PCT Pub. Date: Oct. 22, 2020

(65) Prior Publication Data
US 2022/0190883 A1     Jun. 16, 2022

(51) Int. Cl.
*H04B 7/0408* (2017.01)
*H04B 7/06* (2006.01)
*H04W 36/08* (2009.01)

(52) U.S. Cl.
CPC ......... *H04B 7/0408* (2013.01); *H04B 7/0695* (2013.01); *H04W 36/085* (2023.05); *H04B 7/0617* (2013.01)

(58) Field of Classification Search
CPC .............. H04W 36/085; H04W 72/085; H04B 7/0408; H04B 7/0695; H04B 7/0617; H04B 7/0413
See application file for complete search history.

(56) References Cited

U.S. PATENT DOCUMENTS

2016/0353467 A1* 12/2016 Nekovee ............. H04W 72/542
2018/0097556 A1*  4/2018 Nagaraja ........... H04W 36/0085
(Continued)

FOREIGN PATENT DOCUMENTS

| CN | 109617584 B | 12/2021 |
| WO | 2019004885 A1 | 1/2019 |

(Continued)

OTHER PUBLICATIONS

International Search Report and Written Opinion for International Application No. PCT/US2019/027998, mailed Nov. 22, 2019 (11 pages).

(Continued)

*Primary Examiner* — Oussama Roudani
(74) *Attorney, Agent, or Firm* — Brake Hughes Bellermann LLP

(57) ABSTRACT

According to an example embodiment, a method may include determining, by a base station, a past beam sequence for a user equipment (UE), determining, by the base station based on the past beam sequence for the user equipment and a beam sequence model, a predicted future beam sequence for the user equipment, wherein the predicted future beam sequence indicates a predicted sequence of beams over time for communication between the user equipment and the base station, and performing, by the base station, a beam-related action based on the predicted future beam sequence for the user equipment.

19 Claims, 12 Drawing Sheets

(56) References Cited

U.S. PATENT DOCUMENTS

| | | | | |
|---|---|---|---|---|
| 2019/0327714 A1* | 10/2019 | Wang | ................... | H04B 7/0695 |
| 2019/0386726 A1* | 12/2019 | Fresia | .................. | H04B 7/0408 |
| 2022/0007258 A1* | 1/2022 | Liou | .................... | H04B 7/0408 |

FOREIGN PATENT DOCUMENTS

| | | |
|---|---|---|
| WO | 2019029802 A1 | 2/2019 |
| WO | 2019045606 A1 | 3/2019 |

OTHER PUBLICATIONS

Ekman et al., "Machine Learning for Beam Based Mobility Optimization in NR", Master of Science Thesis in Communication Systems Department of Electrical Engineering, Linkoping University, 2017, 85 pages.

Office Action for India Application No. 202117047502, mailed on Mar. 30, 2022, 6 pages.

International Preliminary Report on Patentability for International Application No. PCT/US2019/027998, mailed on Oct. 28, 2021, 9 pages.

Office Action and Search Report for Chinese Patent Application No. 201980097290.7, mailed on Jan. 26, 2024, 14 pages.

Office Action for European Patent Application No. 19722757.2; mailed on Feb. 13, 2024, 4 pages.

"Fourier", Information & Communications; (Sum. No 119), Mar. 2012, 2 pages.

\* cited by examiner

BEAM PREDICTION FOR WIRELESS NETWORKS

CROSS-REFERENCE TO RELATED APPLICATIONS

This application is a national stage entry of International Application No. PCT/US2019/027998, filed Apr. 17, 2019, entitled "BEAM PREDICTION FOR WIRELESS NETWORKS" which is hereby incorporated by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. For example, ultra-reliable and low-latency communications (URLLC) devices may require high reliability and very low latency.

SUMMARY

According to an example embodiment, a method may include: determining, by a base station, a past beam sequence for a user equipment (UE); determining, by the base station based on the past beam sequence for the user equipment and a beam sequence model, a predicted future beam sequence for the user equipment, wherein the predicted future beam sequence indicates a predicted sequence of beams over time for communication between the user equipment and the base station; and performing, by the base station, a beam-related action based on the predicted future beam sequence for the user equipment.

According to an example embodiment, an apparatus may include means for determining, by a base station, a past beam sequence for a user equipment (UE); means for determining, by the base station based on the past beam sequence for the user equipment and a beam sequence model, a predicted future beam sequence for the user equipment, wherein the predicted future beam sequence indicates a predicted sequence of beams over time for communication between the user equipment and the base station; and means for performing, by the base station, a beam-related action based on the predicted future beam sequence for the user equipment.

According to an example embodiment, an apparatus may include: at least one processor; and at least one memory including computer program code; the at least one memory and the computer program code configured to, with the at least one processor, cause the apparatus at least to: determine, by a base station, a past beam sequence for a user equipment (UE); determine, by the base station based on the past beam sequence for the user equipment and a beam sequence model, a predicted future beam sequence for the user equipment, wherein the predicted future beam sequence indicates a predicted sequence of beams over time for communication between the user equipment and the base station; and perform, by the base station, a beam-related action based on the predicted future beam sequence for the user equipment.

According to an example embodiment, a non-transitory computer-readable storage medium comprising instructions stored thereon that, when executed by at least one processor, are configured to cause a computing system to perform a method of: determining, by a base station, a past beam sequence for a user equipment (UE); determining, by the base station based on the past beam sequence for the user equipment and a beam sequence model, a predicted future beam sequence for the user equipment, wherein the predicted future beam sequence indicates a predicted sequence of beams over time for communication between the user equipment and the base station; and performing, by the base station, a beam-related action based on the predicted future beam sequence for the user equipment.

The details of one or more examples of embodiments are set forth in the accompanying drawings and the description below. Other features will be apparent from the description and drawings, and from the claims.

DETAILED DESCRIPTION

Figure 1:
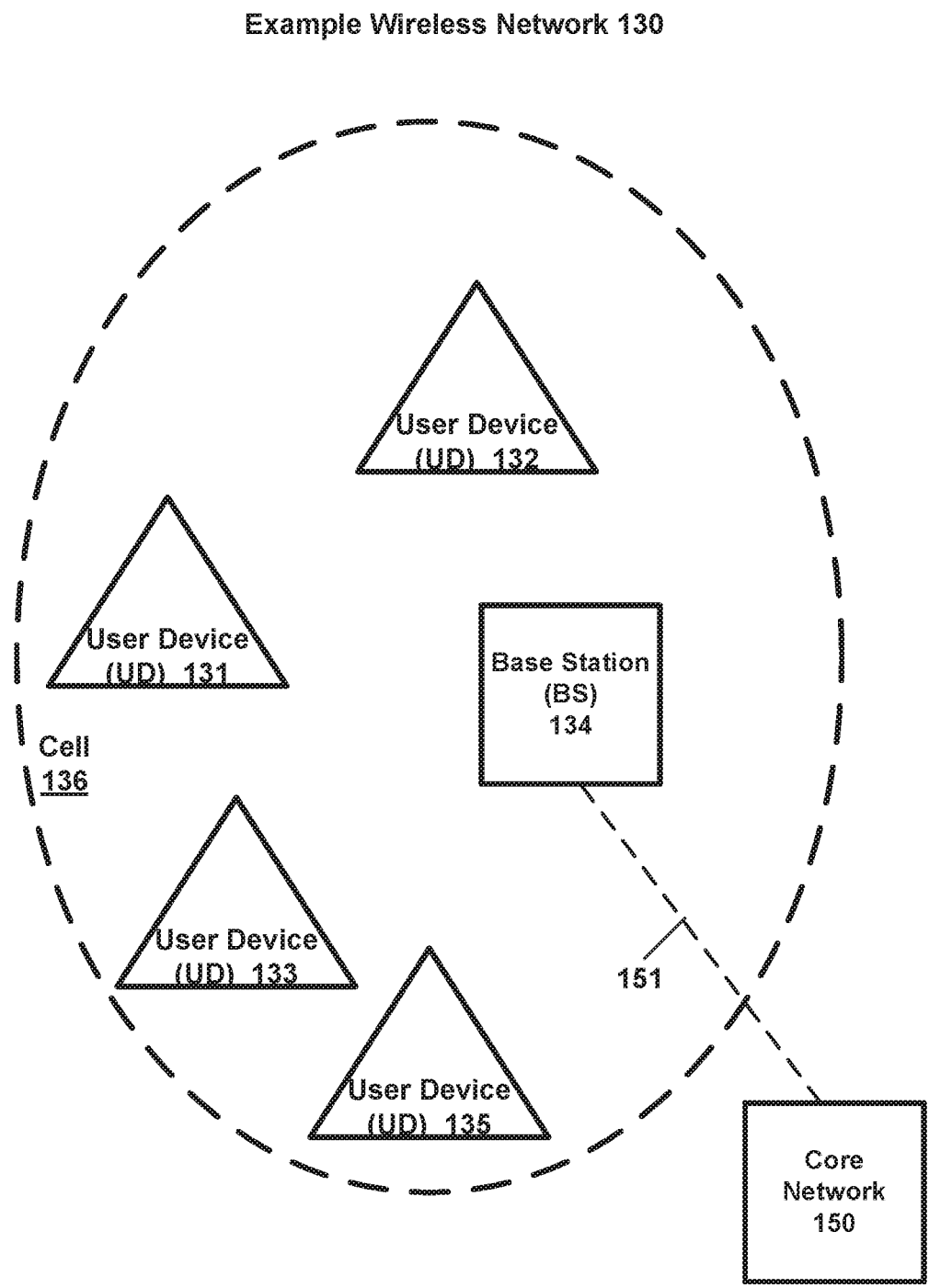
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e)Node B (eNB), gNB, RAN node) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) may provide one or more wireless communication services for one or more UEs or user devices, e.g., to allow the UEs to have wireless access to a network, via the RAN node. Each RAN node may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (NR) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Various example implementations may relate, for example, to 5G radio access systems (or other systems) with support for Massive MIMO (multiple input, multiple output) and optimized for operating in high carrier frequencies such as cmWave frequencies (e.g., from 3 GHz onwards) or mmWave frequencies, as examples, according to illustrative example implementations. Those illustrative systems are typically characterized by the need for high antenna gain to compensate for increased pathloss and by the need for high capacity and high spectral efficiency to respond to ever increasing wireless traffic. According to an example implementation, the increased attenuation at higher carrier frequencies may, for example, be compensated by introducing massive (multi-element) antenna arrays and correspondingly antenna gain via beamforming at the base station (BS) (also referred to as eNB or gNB) and/or UE/user device. The spectral efficiency may typically improve with the number spatial streams the system can support and thus with the number of antenna ports at the BS. According to an example implementation, spatial multiplexing may include a transmission technique in MIMO wireless communication to transmit independent and separately encoded data signals, so-called streams, from each of the multiple transmit antennas.

For example, for massive multiple input multiple output (M-MIMO) system, a large number of antenna elements may typically be used at a transmitter and/or receiver (e.g., at a base station/access point or other network node). M-MIMO may typically have more spatial links/layers and provides more spatial degrees of freedom. In an illustrative example, with well designed antenna weights, a MIMO or M-MIMO transmitter can generate relatively narrow beams with good spatial separation. Thus, such a transmitter can achieve greater beamforming gain, reduce the spatial interference range and obtain greater multiple user spatial multiplexing gain. A MIMO or M-MIMO system may typically have better performance in terms of data rate and link reliability compared with other systems.

Beamforming or spatial filtering is a signal processing technique that may be used for antennas or antenna arrays for directional signal transmission or reception. Beamforming can be used at both the transmitting and receiving ends in order to achieve spatial selectivity. For example, a set of beam weights (e.g., with each beam weight including a gain and/or phase) may be applied to an antenna system during transmission or reception of a signal to transmit or receive, respectively, the signal via a specific beam.

According to an example embodiment, to enable beam management for a large number of beams, NR/5G may support hierarchical beam refinement. At a first level is a set of basic beams or broad beams, such as synchronization signal block and physical broadcast channel (SSB/PBCH) beams (e.g., which may be referred to as SSB beams), which may include, for example, up to 64 SSB beams within a cell; and, at a second (more refined) level, a set of refined beams, e.g., such as a set of CSI-RS (channel state information-reference signal) beams. For example, the CSI-RS beams may be narrower refinement beams, while with SSB beams may be wider or root (or basic) beams. For example, the serving beams may be updated based on UE measurements, reporting and beam recovery procedures as the UE moves or a propagation environment changes. For example, a basic beam (e.g., a SSB beam) may be selected and used during initial access or a random access procedure. Then, a refined beam (e.g., CSI-RS beam) may also be selected after a UE has established a connection with a BS (e.g., gNB), and may be updated from time to time.

According to an illustrative example embodiment, for initial beam establishment, a BS may transmit a SSB (or SSB/PBCH) reference signal via each of a plurality of SSB beams. For example, a different SSB resource (e.g., a different time-frequency resource for each SSB signal) may be used to transmit the SSB signal for each SSB beam. Thus, each SSB resource is associated with a SSB beam. A UE may perform a signal measurement (e.g., measure a reference signal received power (RSRP) or other signal measurement) for one or more received SSB beams/SSB resources, and then may determine or select a best or a highest power SSB beam (or a best set of N beams) and the associated SSB resource. There may be a different random access preamble associated with each SSB resource/SSB beam. The UE may then transmit to the BS a random access preamble associated with the selected SSB resource, as part of a random access procedure, in order to identify the best (or UE selected) SSB beam. Thus, a UE may indicate to the BS a best SSB beam (including a best BS transmit beam) based on the random access preamble transmitted to the BS. The UE may also determine a best UE receive beam for this best SSB transmit beam. Thus, an initial beam pair may be used by the BS and UE to perform a random access procedure, in order to establish a connection between the UE and BS.

Thus, at initial access, a UE may select a beam, e.g., a beam associated with a best (e.g., a strongest RSRP) SSB resource for physical random access (PRACH) preamble selection. Thus, the UE may transmit a random access preamble that is associated with the selected (e.g., best) SSB beam (associated with the best SSB resource/SSB beam). For example, the selected random access (RACH) preamble indicates to the BS which of the SSB/PBCH block beams (or simply SSB beams) the BS should use for Msg2, Msg3 and Msg4 of the random access procedure with the UE. The BS/gNB may use the indicated SSB beam for signal transmission and reception, for example. This procedure may determine a sufficient or good enough beam pair for initial access. Further beam refinement may be implemented in the connected state using CSI-RS resources.

Once an initial beam pair has been established between a UE and a BS, further beam adjustment or beam refinement may be performed based on a transmission of multiple CSI-RS (channel state information-reference signals) signals from the BS, with each of the different CSI-RS signals transmitted via a different or associated CSI-RS beam. Thus, each CSI-RS resources is associated with a refined (e.g., CSI-RS) beam. For example, a BS may select a different refined CSI-RS beam with respect to a UE based on measurement reports (e.g., CSI-RS beam measurement reports) received from the UE.

Figure 2:
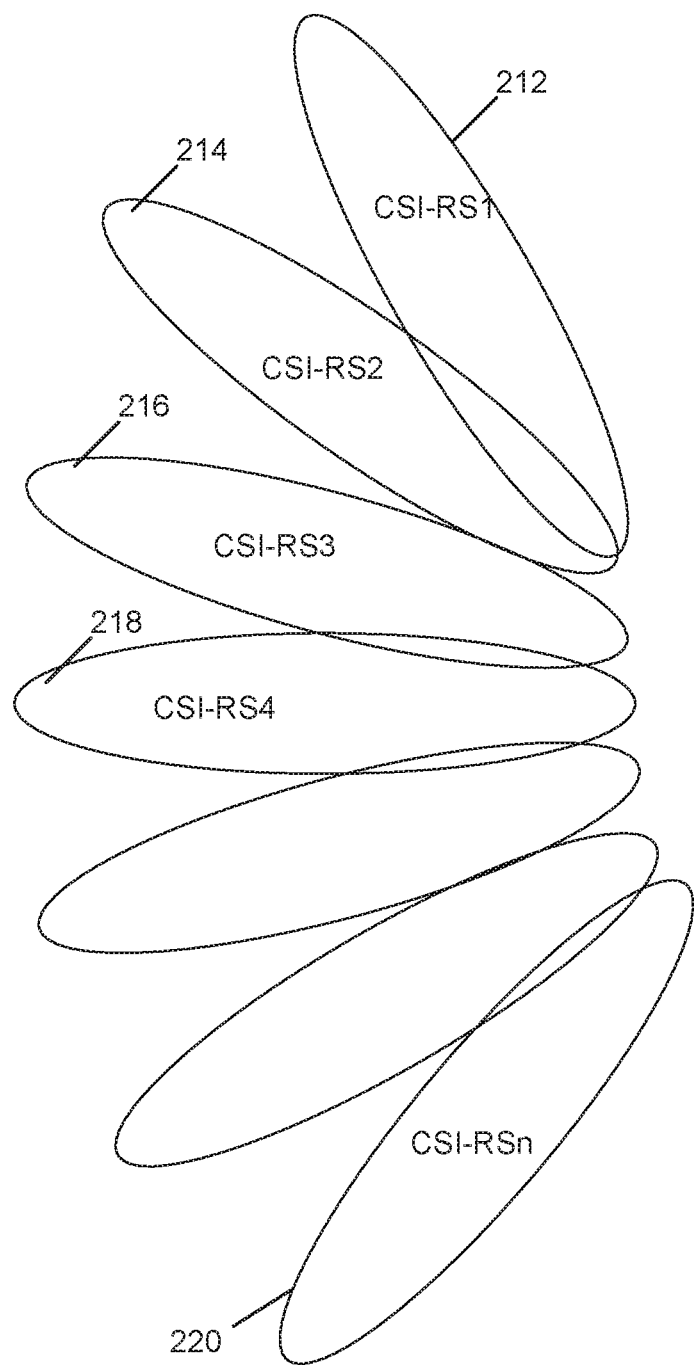
FIG. 2 is a diagram illustrating a different resource and an associated beam for each of a plurality of beams according to an example embodiment.

FIG. 2 is a diagram illustrating a different resource and an associated beam for each of a plurality of beams according to an example embodiment. In this illustrative example, a CSI-RS (channel state information-reference signal) signal is transmitted via different CSI-RS time-frequency resources and via associated CSI-RS beam. Thus, each CSI-RS beam is associated with a different CSI-RS resource. For example, beam 212 is associated with CSI-RS1 resource; beam 214 is associated with CSI-RS2 resource; beam 216 is associated with CSI-RS3 resource; beam 218 is associated with CSI-R41 resource, . . . and beam 220 is associated with CSI-RSn resource. This is merely an illustrative example, and any number of beams may be provided. Similarly, a different time-frequency resource may be associated with each SSB beam. Thus, a UE may measure a signal parameter (e.g., RSRP, or other signal parameters) of a reference signal received on each of a plurality of these resources, where each resource is associated with a different beam. Thus, by reporting (e.g., in a measurement report) a RSRP (or other signal parameter) and a beam identifier or resource identifier for one or more of the resources, this may identify both the measured RSRP (or other signal parameter) and the associated beam to the BS (e.g., for the best or strongest 2 beams, or strongest 4 beams, as an example).

A BS may configure one or more parameters of the beam measurement reports to be provided by the UE to the BS. For example, the BS may send a measurement report configuration, or simply report configuration (which may be provided by BS to the UE as control information) indicating or updating one or more parameters or aspects of the beam measurement report to be provided by the UE to the BS. For example, the report configuration may indicate or update various parameters, such as a set of resources (e.g., a set of CSI-RS resources, or a set of SSB resources) to be measured, a number of resources/beams to be reported (e.g., configuring the UE to report a RSRP for best (strongest) two beams/resources, or the best 4 beams/resources), a frequency or timing of the measurement reports, and other parameters. Based on this report configuration, the UE may measure the set of resources (e.g., set of SSB or CSI-RS resources, with each resource associated with a beam) and report a signal measurement (e.g., RSRP or other signal measurements) for one or more resources/beams (e.g., report RSRP for the two or four strongest resources/beams) to the BS. For example, the UE may measure and report, every 10 ms, the RSRP of the two (or four, or other number of) refined beams (e.g., CSI-RS beams) having the highest measured RSRP. The BS may then, for example, switch its receive beam (to receive information or signals from the UE) and/or its transmit beam (to transmit information or signals to the UE) based on the information indicated in this measurement report (e.g., BS may switch to the CSI-RS beam having the highest RSRP).

For the purposes of beam refinement and tracking, the BS (or gNB, eNB) may configure (e.g., by sending a report configuration or other configuration information to the UE) a CSI-RS resource set (a set of CSI-RS resources or a set of associated CSI-RS beams, to be measured by the UE). Based on this report configuration (e.g., which may indicate a set of CSI-RS resources or a set of CSI-RS beams to be measured and/or reported by the UE), the UE may measure a signal parameter (e.g., RSRP) of a set of resources/beams, and then send a measurement report to the BS, indicating the signal measurement (e.g., RSRP) of one or more resources/beams. As noted, the BS may receive relevant measurement reports, and may adjust or change its transmit beam and/or receive beam with respect to the UE based on these measurement reports. For example, the BS may select the best refined beam, e.g., the CSI-RS beam having the highest RSRP, for communicating with the UE.

According to an example embodiment, CSI (channel state information) may include Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP (reference signal received power). The CSI-RS resources may be periodic, semi-persistent, or aperiodic, for example. The report configuration for CSI-RS may be aperiodic (e.g., using physical uplink shared channel (PUSCH)), periodic (e.g., using physical uplink control channel (PUCCH)) or semi-persistent (using PUCCH, and DCI (downlink control information) activated PUSCH).

However, a number of challenges or problems may arise as part of this process, such as part of the beam (e.g., CSI-RS resource or SSB resource) measurement, reporting and/or usage (the BS's use of these measurement reports) process. First, for example, it may be desirable to improve performance of beam switching decisions by a BS, e.g., to allow a BS to more consistently select an appropriate (or even a best) beam prior to a connection or performance drop. Second, for example, at least in some cases, the processing overhead and/or signaling overhead related to sending report configurations, performing beam measurement, and/or sending measurement reports may become burdensome (as experienced by the BS and/or UE), e.g., especially as the number of beams to be measured and/or the frequency of measurement reports increases.

For example, the number of CSI-RS resources that a BS needs to configure for UE measurement, and frequency of measurement reports sent by the UE may be directly related to the number of refinement (e.g., CSI-RS) beams for which the BS needs measurement reports from the UE. In a typical implementation with multiple transmission reception points (TRPs) and a rapidly changing environment such as in a city with cars and/or people moving, frequent reports based on a measurement and reporting for a relatively large number of beams may be required to allow the BS to overcome blocking (e.g., a signal blocking condition in which a signal path between UE and BS based on a current pair of beams becomes blocked, and the BS thus may need to quickly change to a better beam to maintain performance or the connection with the UE). A TRP may include a BS (e.g., eNB, gNB), a distributed unit (DU) (e.g., in the case of a split BS where the BS may be split into a control unit (CU) and one or more distributed units (DUs)), or other network device that may transmit or receive signals to UEs. According to an example embodiment, a single base station (BS) may be connected to multiple TRPs, and the TRPs may share the same DU.

In some example situations, such as for 5G/New Radio (NR), a UE may need to monitor a significant or even a large number of CSI-RS resources (a large number of CSI-RS beams) which may be associated with individual beams and cells. Many of the resources may be UE-specific and there may be different resources for control and data channels. The number of required resources may increase both with the number of beams, users/UEs and/or configuration of channels. Moreover, conveying of these resources (e.g., via sending report configuration or other control information) may consume or use significant UE-specific resources (e.g., such as radio resource control (RRC) and/or and media access control (MAC) signaling resources, or other resources). Based on the received report configuration from the BS (indicating CSI-RS resources or a number of CSI-resources to be monitored and/or reported), the UE monitors the specific resources and sends measurement reports to the BS. The number of required resources for resource monitoring and the amount of resources required to send measurement reports from the UE, at least in some cases, may require significant resources, and thus, may pose an overhead problem for some situations and/or technologies, especially as the number of beams to be measured or reported and/or the number of UEs within a cell increase. Without a sufficient number of measurement reports frequently being sent by the UE to the BS, blocking events may interrupt the service provided by the BS to the UE (or interrupt or reduce the performance of the connection between the BS and UE) since, for example, the BS may not know which beam of which TRP (or BS) to switch to upon occurrence or detection of a blocking condition.

Thus, according to an example embodiment, a BS (e.g., gNB, a TRP or a radio access network (RAN) node) or other network node may use or employ an artificial intelligence (AI) neural network (which may be referred to as a neural network, a neural network model, an AI neural network model, an AI model, a machine learning model or algorithm, or other term) to implement a beam sequence model. The beam sequence model, e.g., which may be implemented as a neural network, or other model, may be trained, e.g., based on a past beam sequence for one or more UEs.

According to an example embodiment, a BS may determine a predicted future sequence of beams for a UE based on the beam sequence model and a past beam sequence for the UE. For example, the beam sequence model (e.g., implemented as a neural network) may output a predicted future sequence of beams for the UE, based on an input that includes a past beam sequence for the UE. According to an illustrative example, a past beam sequence for a UE may include one or more beams that were actually used to communicate between the BS and UE, and/or one more best beams that were reported in a measurement report(s), e.g., a best beam for each beam measurement interval. In some cases, a highest RSRP beam (e.g., best beam) may not always be actually used by a BS to communicate with a UE, e.g., where a handover signal threshold was not met and prevented a handover to a target BS (that was associated with the best beam) at that time.

A BS may perform a variety of beam-related actions based on the predicted future beam sequence for the UE. For example, the predicted future beam sequence for a UE may indicate a predicted beam (e.g., identified with a specific beam index) and a probability, for each of a plurality of beam sampling intervals (e.g., for every 10 ms interval into the future). For example, there may exist common paths that many (or a significant percentage of) users/UEs often travel on, e.g., based on roads, sidewalks, building layouts, etc. Also, for example, many (or a significant number of) UEs that successfully maintain a connection while traveling over such a common path may use a sequence of beams over a period of time that may be the same or very similar, or at least have a number of common beams that were used by UEs over time (e.g., each beam sampling interval). These past beam sequences for various UEs may thus be input to train a beam sequence model (e.g., which may be implemented as a neural network). Then, for example, a BS may use the beam sequence model to determine a predicted future beam sequence for a UE, based on a past beam sequence for the UE.

As an example beam-related action with respect to the UE, the BS may change its receive beam and/or transmit beam with respect to the UE, to a beam that is indicated or listed on the predicted future beam sequence for the UE. For example, the BS may preemptively switch to a next beam in the list of beam indexes of the predicted future beam sequence for a UE, e.g., just prior to that associated future beam sampling interval. Or, for example, the BS may perform a handover to a target TRP (or target BS) if a future beam index indicated in the predicted future beam sequence lists a beam that is associated with (or provided by) the target BS or TRP, that is different from the currently serving BS or TRP.

Also, as another example beam-related action with respect to the UE, the BS may reduce overhead associated with measuring and/or reporting of beams. For example, the BS, e.g., based on a predicted future beam sequence for a UE, may send an updated report configuration to the UE to adjust one or more measurement related parameters, such as to reduce a number of beams (or associated beam resources) to be measured or reported, or indicate a specific list of beams to be measured and/or reported to the BS (e.g., to measure only the next predicted sequence of N beams that are indicated, instead of measuring a larger number of beams), and/or adjust a frequency of beam measurement reports to be sent to the BS. For example, it may be possible, in some cases, that a number of beams that need to be measured and/or reported, and/or a frequency of beam measurement reports, may be reduced based on improved accuracy provided by the predicted future beam sequence for a UE. Thus, the UE may be asked to measure a smaller set of beams (e.g., measure the next 7 beams/resources indicated in the predicted future beam sequence, instead of a larger set of beams/resources), and/or to report a smaller set of beams (e.g., report the RSRP of the best 2 beams, rather than reporting a best 4 beams) that are indicated in the predicted future beam sequence. Also, a frequency of beam measurement reports may, at least in some cases, be reduced, e.g., based on an improved accuracy of the beams indicated in the predicted future beam sequence for the UE, for example.

These are some examples, and other beam-related actions may be performed. In this manner, one or more techniques described herein may offer technical advantages or improvements in performance, such as an improvement related to a selection and/or use of a beam, and/or a reduction in processing overhead or resource overhead related to beam measurement or measurement reporting, for example.

According to an example embodiment, a method or technique may include determining, by a BS, a past beam sequence for a user equipment (UE); determining, by the BS based on the past beam sequence for the UE and a beam sequence model, a predicted future beam sequence for the UE, wherein the predicted future beam sequence indicates a predicted sequence of beams over time for communication between the UE and BS; and performing, by the BS, a beam-related action based on the predicted future beam sequence for the UE.

According to an example embodiment, the performing the beam-related action may include performing, by the BS, one or more of the following: changing, by the BS based on the predicted future beam sequence for the UE, a transmit beam used by the BS for downlink transmission to the UE; changing, by the BS based on the predicted future beam sequence for the UE, a receive beam used by the BS for uplink reception from the UE; changing, by the BS based on the predicted future beam sequence for the UE, one or more aspects of a beam measurement report to be provided by the UE to the BS; sending, by the BS to the UE, an updated report configuration to adjust a number of beams, or a number of associated reference signal resources, to be measured and/or reported by the UE within a beam measurement report; sending, by the BS to the UE, an updated report configuration to adjust a list or set of one or more specific beams or adjust a set of specific reference signal resources, to be measured by the UE; sending, by the BS to the UE, an updated report configuration to adjust a number of beams or reference signal resources to be reported by the UE within a beam measurement report; sending, by the BS to the UE, an updated report configuration to adjust a frequency of beam measurement reports to be sent by the UE to the BS; causing, by the BS, a handover of the UE to be performed from the BS to a target BS; causing, by the BS, a handover of the UE to be performed from the BS to a target BS based on a beam, which is associated with the target BS, indicated in the predicted future beam sequence for the UE; or sending, by the BS to the UE, a request for a beam measurement report.

In an example embodiment, the beam sequence model may include a neural network, the method further including: training the beam sequence model based on a past beam sequence for one or more user equipments (UEs).

In an example embodiment, the beam sequence model may include a neural network, the method further including: performing, by the base station, the following for one or more past beam sequences for one or more user equipments (UEs): determining a past beam sequence for a first user equipment (UE); determining a first portion of the past beam sequence for the first UE as an input to the beam sequence model during training; determining a second portion, subsequent in time to the first portion, of the past beam sequence for the first UE as a correct output of the beam sequence model during training; determining a predicted future beam sequence output, during training, from the beam sequence model based on the first portion of the past beam sequence as an input to the beam sequence model; determining an error of the beam sequence model based on a comparison between the correct output of the beam sequence model during training and the predicted future sequence output by the beam sequence model during training; and adjusting one or more weights of the beam sequence model to reduce the error.

According to an example embodiment, the predicted future beam sequence for the UE includes a sequence of beam indexes, and a probability associated with each beam index, wherein each beam index identifies a beam.

According to an example embodiment, the past beam sequence for the UE includes a plurality of beams, wherein each beam of the past beam sequence is determined from one or more of the following: a beam that was used by the BS, for one or more beam sampling intervals, to transmit signals to the UE or receive signals from the UE, and which did not result in a loss of connection between the BS and the UE; a beam that was used by the UE, for one or more beam sampling intervals, to transmit signals to the BS or receive signals from the BS, and which did not result in a loss of connection between the BS and the UE; a beam measurement report, received by the BS from the UE, indicating one or more beams measured by the UE with respect to the BS that have a highest signal measurement; or a beam or a set of beams, determined by the BS based on a set of reference signals received from the UE, that has a highest signal measurement, for one or more beam sampling intervals.

According to an example embodiment, performing the beam-related action may include: changing, by the BS based on the predicted future beam sequence for the UE, one or more aspects of a beam measurement report to be provided by the UE to the BS, including at least one of: a number of beams, or a number of associated reference signal resources, to be measured and/or reported by the UE within a beam measurement report; a list of one or more specific beams, or a list of one or more specific reference signal resources, to be measured and/or reported by the UE within a beam measurement report; or a frequency of beam measurement reports to be sent by the UE to the BS, or other beam-related action.

According to an example embodiment, the beam sequence model may be provided or implemented as an artificial intelligence (AI) neural network (which may be referred to as a neural network, a neural network model, an AI neural network model, an AI model, a machine learning model or algorithm, or other term). According to an example embodiment, neural networks may be or may include computational models used in machine learning made up of nodes organized in layers. The nodes are also referred to as artificial neurons, or simply neurons, and perform a function on provided input to produce some output value. A neural network typically requires a training period to learn the parameters, i.e., weights, used to map the input to a desired output. The mapping occurs via the function. Thus, the weights are weights for the mapping function of the neural network. Each AI model or neural network may be trained for a specific task.

To provide the output given the input, the neural network must be trained, which may involve learning the proper value for a large number of parameters for the mapping function. The parameters are also commonly referred to as weights as they are used to weight terms in the mapping function. This training may be an iterative process, with the values of the weights being tweaked over thousands of rounds of training until arriving at the optimal, or most accurate, values. In the context of neural networks, the parameters may be initialized, often with random values, and a training optimizer iteratively updates the parameters, also referred to as weights, of the network to minimize error in the mapping function. In other words, during each round, or step, of iterative training the network updates the values of the parameters so that the values of the parameters eventually converge on the optimal values.

According to an example embodiment, neural networks can be trained in either a supervised or unsupervised manner. In supervised learning, training examples are provided to the neural network or other machine learning algorithm. A training example includes the inputs and a desired or previously observed output. Training examples are also referred to as labeled data because the input is labeled with the desired or observed output. In the case of a neural network, the network learns the values for the weights used in the mapping function that most often result in the desired output when given the training inputs. In unsupervised training, the machine learning model learns to identify a structure or pattern in the provided input. In other words, the model identifies implicit relationships in the data. Unsupervised learning is used in many machine learning problems and typically requires a large set of unlabeled data.

According to an example embodiment, the learning or training of a neural network model may be classified into (or may include) two broad categories (supervised and unsupervised), depending on whether there is a learning "signal" or "feedback" available to a model. Thus, for example, within the field of machine learning, there may be two main types of learning or training of a model: supervised, and unsupervised. The main difference between the two types is that supervised learning is done using known or prior knowledge of what the output values for certain samples of data should be. Therefore, a goal of supervised learning may be to learn a function that, given a sample of data and desired outputs, best approximates the relationship between input and output observable in the data. Unsupervised learning, on the other hand, does not have labeled outputs, so its goal is to infer the natural structure present within a set of data points.

Supervised learning: The computer is presented with example inputs and their desired outputs, and the goal may be to learn a general rule that maps inputs to outputs. Supervised learning may, for example, be performed in the context of classification, where a computer or learning algorithm attempts to map input to output labels, or regression, where the computer or algorithm may map input(s) to a continuous output(s). Common algorithms in supervised learning may include, e.g., logistic regression, naive Bayes, support vector machines, artificial neural networks, and random forests. In both regression and classification, a goal may include to find specific relationships or structure in the input data that allow us to effectively produce correct output data. As special cases, the input signal can be only partially available, or restricted to special feedback: Semi-supervised learning: the computer is given only an incomplete training signal: a training set with some (often many) of the target outputs missing. Active learning: the computer can only obtain training labels for a limited set of instances (based on a budget), and also has to optimize its choice of objects to acquire labels for. When used interactively, these can be presented to the user for labeling. Reinforcement learning: training data (in form of rewards and punishments) is given only as feedback to the program's actions in a dynamic environment, e.g., using live data.

Unsupervised learning: No labels are given to the learning algorithm, leaving it on its own to find structure in its input. Some example tasks within unsupervised learning may include clustering, representation learning, and density estimation. In these cases, the computer or learning algorithm is attempting to learn the inherent structure of the data without using explicitly-provided labels. Some common algorithms include k-means clustering, principal component analysis, and auto-encoders. Since no labels are provided, there is no specific way to compare model performance in most unsupervised learning methods.

Neural networks can be of many types, e.g., such as feed forward, recurrent, convolutional, Q-learning networks, LSTM, etc. Each cell (and each UE within each cell) has widely different characteristics, e.g., such as a distance to neighbor cells, propagation characteristics (delay spread, scatter/reflection, path loss exponent, etc.), SINR (signal to interference plus noise ratio) measurements or variations, antenna channel weights, cell load conditions, etc. These may differ from user-to-user (from UE to UE), from cell-to cell, and within a cell (or group of cells) over time.

Further illustrative examples and example embodiments will be briefly described.

According to an example embodiment, NR (New Radio/5G) antenna panels have the capability to form multiple sets of beams to cover a given sector. At the time of deployment in the field, specific subset of beams may be included in a 'beam set' taking into account the traffic distribution. The beam set will typically include broad SSB beams and narrow refinement (e.g., CSI-RS) beams. The SSB beams may be swept (beam sweeping) periodically and will support initial access and subsequently CSI-RS transmissions could be used for beam refinement. The areas which are served by these beam sets typically have unique geographical and usage characteristics, and many users/UEs moving through the cells may go through the same sequence of beam transitions over time. As a result, many users/UEs may use and/or report a same (or very similar) sequence of best (e.g., strongest signal or highest RSRP) beam(s) as they travel or traverse a common path (e.g., sidewalk or road). Thus, for example, one example basis for beam prediction may be that users/UEs may travel one or more common paths, e.g., based on sidewalks, roads, or other frequently traveled paths, etc., and may typically encounter the same blocking objects, such as buildings or other fixed objects.

Thus, people or users may often stay on roads and sidewalks and walk or drive in a certain direction for a period of time. A fixed blockage at a specific location of a road will have similar impact on (e.g., all or most) users traveling on the road. Instead of making beam refinement measurement requests to the UE on a large set of beams, example embodiments may allow configuring of CSI-RS resources for beam refinement and measurement reports by predicting the set of beams that will most likely best serve the user/UE over a period of time, e.g., over the next several hundred milliseconds. Accurate prediction enables reduction in the set of beams for which measurement reporting will be needed. Thus, for example, once a beam sequence model learns the past beam sequences for many UEs, the trained beam sequence model may be used to determine a predicted future beam sequence based on a past beam sequence of a UE.

These predictions may be performed using artificial intelligence (AI) algorithms running on a BS or gNB, for example. The algorithms extract features from experiences of past usage both temporally and spatially and apply the learning to the current users/UEs being served to improve BS performance in terms of beam selection and/or reduce beam tracking overhead. Based on the features extracted, users can be classified into categories following certain 'beam tracks' from which beam usage pattern of users can tracked accurately. In particular, in case of blocking, the BS, via the beam sequence model, may predict which beam a user/UE should connect to based on the sequence of beams serving the user up to that point, and significantly reduce the number of resources needed for measurement. The user/UE may also be transitioned to the predicted beam proactively to avoid blocking.

Figure 3:
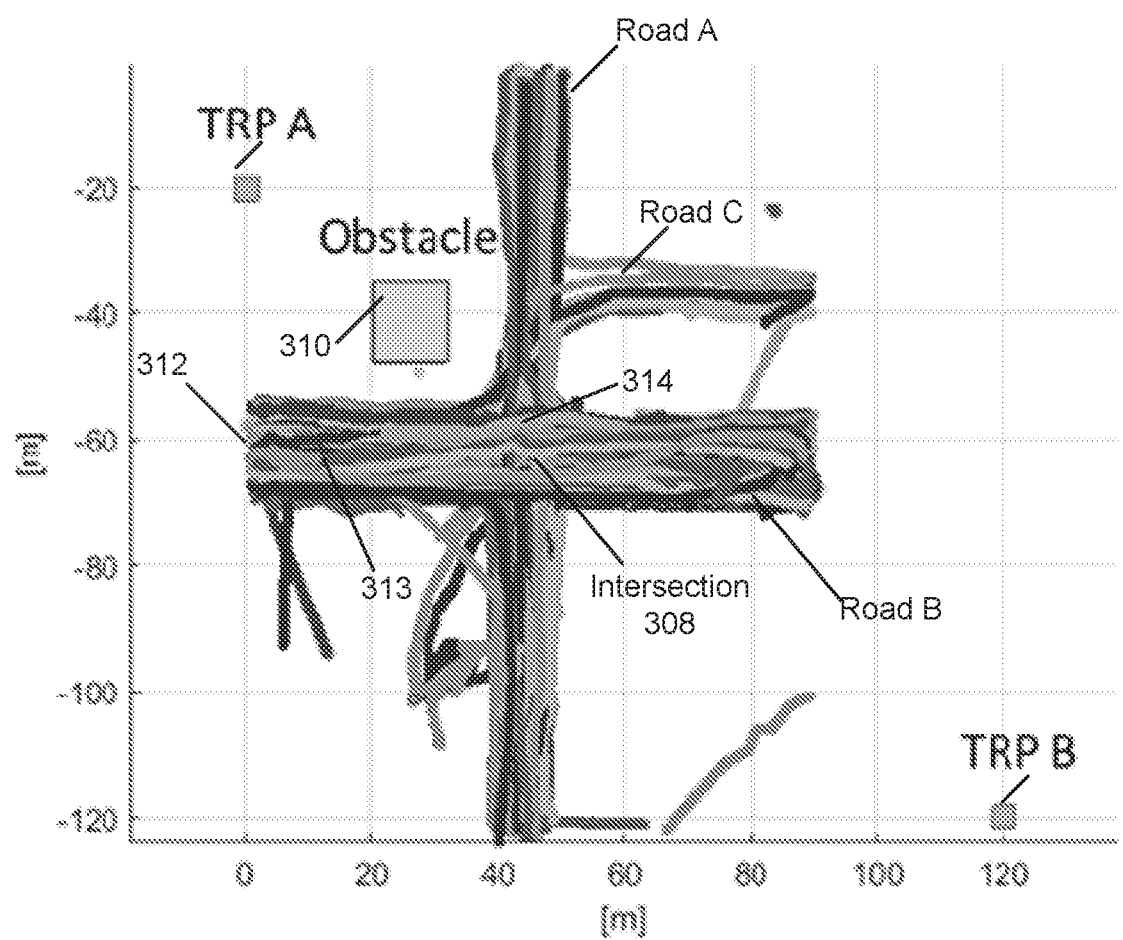
FIG. 3 is a diagram illustrating paths traveled by multiple UEs/users through an intersection according to an example embodiment.

FIG. 3 is a diagram illustrating paths traveled by multiple UEs/users through an intersection according to an example embodiment. As shown in the illustrative example of FIG. 3, an intersection 308 is shown as the intersection of Road A and Road B. An additional Road C intersects Road A at a different location. An obstacle 310 is shown, and may be a building or other object. A transmission reception point (TRP) A and a TRP B may provide wireless coverage to UEs within one or more cells. TRP A and/or TRP B may each be a BS or DU, or other network node. As a very simple illustrative example, a UE traveling on Road B (from left to right on FIG. 3) may initially be at position 312 where a best BS beam (to communicate with the UE) may be beam 1 (not shown) from TRP A. The UE may then arrive at position 313, where a best BS beam for the UE may be beam 2 (not shown) provided by TRP A. Then the UE may arrive at position 314 within intersection 308. However, the obstacle 310 may cause a blocking condition between the UE at position 314 and TRP A. Thus, at position 314, the best (e.g., highest RSRP) beam for the UE may not be a beam provided by TRP A, but may be a beam provided by TRP B. Thus, when the UE is at position 14, due to the obstacle 310, the best beam for the UE may be beam 10 (not shown) provided by TRP B. Thus, while variations may occur for UEs traveling left to right on Road B, many of the UEs may provide measurement reports that indicate a beam sequence (e.g., best beam for the UE) of beam 1, beam 2 (both provided by TRP A), and then beam 10 (provided by TRP B). Or, TRP A may adjust (e.g., reduce) the CSI-RS resources measured.

Based on past beam sequences for many UEs, the beam sequence model at TRP A (and/or TRP B) may be trained to learn this common pattern of beam sequences. For example, a beam sequence model for TRP A may learn that to successfully maintain a connection for a UE, a beam sequence of beam 1, followed by beam 2, often (e.g., 75% of the time) is (or should be) followed by a handover to TRP B and beam 10, e.g., in order to avoid a blocking condition and disconnection for the UE. Thus, TRP A, after receiving a measurement report(s) from the UE indicating beam 1, and then subsequently beam 2 as the best (e.g., highest RSRP beams), may obtain (from the beam sequence model) a predicted future beam sequence for the UE that indicates (e.g., with 75% probability) that the next beam for the UE should be beam 10 provided by TRP B. Thus, according to this illustrative example, TRP B may preemptively perform a handover or change from TRP A to TRP B after receiving beam measurement reports from the UE indicating beam 1, and then beam 2 as the past beam sequence. This is a very simple example, and merely illustrates how past beam sequences may be used to train a beam sequence model and then used to determine or provide a predicted future beam sequence.

Also, for example, the input beam sequences used to train the beam sequence model may be filtered to remove any "bad" (undesirable) beam sequences that resulted in a low performance connection or other undesirable result, such as a loss of connection between a UE and BS. Thus, "bad" beam sequences may be omitted from the training input to the beam sequence model, so that the beam sequence model may be trained only with beam sequences that resulted in a desired or specific result or behavior (e.g., beam sequences that did not result in a dropped connection, or beam sequences that maintained a connection performance above a threshold). Thus, for example, a BS may omit (as an input to the beam sequence model for training) a sequence of beams that resulted in a dropped connection of the UE within X future beam sampling intervals e.g., within 20 ms). Thus, for example, only a portion of a beam sequence (a sequence of reported best beams from a UE) may be used, while omitting the portion of such sequence of beams that resulted in a dropped connection within a threshold period of time, e.g., within 30 ms. This is merely one illustrative example.

Figure 4:
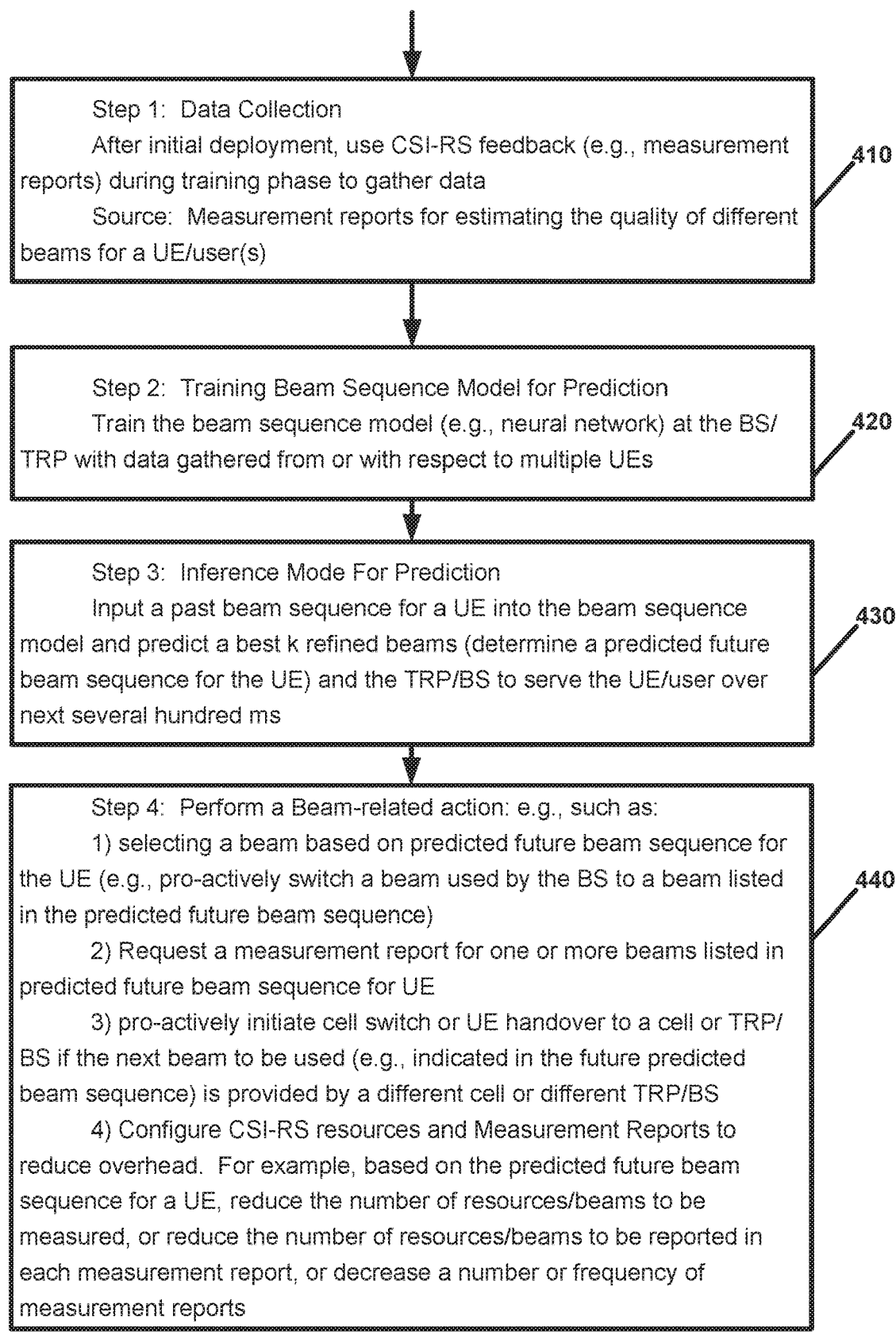
FIG. 4 is a flow chart illustrating operation of a system according to an example embodiment.

FIG. 4 is a flow chart illustrating operation of a system according to an example embodiment. At 410, step 1 may include data collection. For example, after initial deployment, a BS may use CSI-RS feedback (e.g., measurement reports) during training phase to gather data. Thus, a source of this data may include measurement reports (and/or a list of beams actually used by a BS for a UE) for estimating the quality of different beams for a UE/user(s). When BSs are first deployed, they may be operated in a training mode where beam refinement procedures are implemented with extensive CSI-reporting configuration. During this time each UE may be requested to report a substantial number of measurement reports for estimating the quality e.g., based on a RSRP or other signal measurement) of different beams as the UE obtains service or is connected to the BS/gNB. This phase provides substantial amount of training data for the beam sequence model (e.g., which may be implemented as a neural network, such as a deep neural network).

At 420, step 2 may include Training a Beam Sequence Model for Prediction. This step may include training the beam sequence model (e.g., neural network) at the BS/TRP with (or based on) data gathered from or with respect to multiple UEs, e.g., to allow the beam sequence model to provide or output a predicted future beam sequence for one or more UEs. For example, the training can make use of the beam indices of the previously used beams (or make use of the measurement reports indicating the best beam(s) for the UE) at every 10 ms interval for a period of a few seconds to predict the future beam indices likely to be used (or that should be used to improve performance) by the user/UE in the next few hundred ms, for example.

At 430, step 3 may include Inference Mode For Prediction. For example, in this step, a past beam sequence for a UE may be input to the beam sequence model, e.g., to determine a predicted future beam sequence for the UE (e.g., predict a best k refined beams, and/or predict the TRP/BS, to best serve the UE/user over a next several hundred ms).

At 440, step 4 may include Performing a Beam-related action: e.g., such as: 1) selecting a beam based on predicted future beam sequence for the UE (e.g., pro-actively switch a beam used by the BS to a beam listed in the predicted future beam sequence); 2) Request a measurement report for one or more beams listed in predicted future beam sequence for UE; 3) pro-actively initiate cell switch or UE handover to a cell or TRP/BS if the next beam to be used (e.g., indicated in the future predicted beam sequence) is provided by a different cell or different TRP/BS; 4) Configure CSI-RS resources and Measurement Reports to reduce overhead; 5) adjust a frequency or number of measurement reports, or adjust a number of beams (or a specific set of beams) to be measured and/or reported. These are merely some examples. For example, based on the predicted future beam sequence for a UE, reduce the number of resources/beams to be measured, or reduce the number of resources/beams to be reported in each measurement report, or decrease a number or frequency of measurement reports; and/or other beam-related action (these are merely some examples). Further illustrative examples and/or details are provided below in FIGS. 5-10, according to various example embodiments. Step 1, of FIG. 4, may include multiple sub-steps, including, e.g., step 1a (an illustrative example shown in FIG. 5), step 1b (an illustrative example shown in FIG. 6), and step 1c (an illustrative example shown in FIG. 7).

Figure 5:
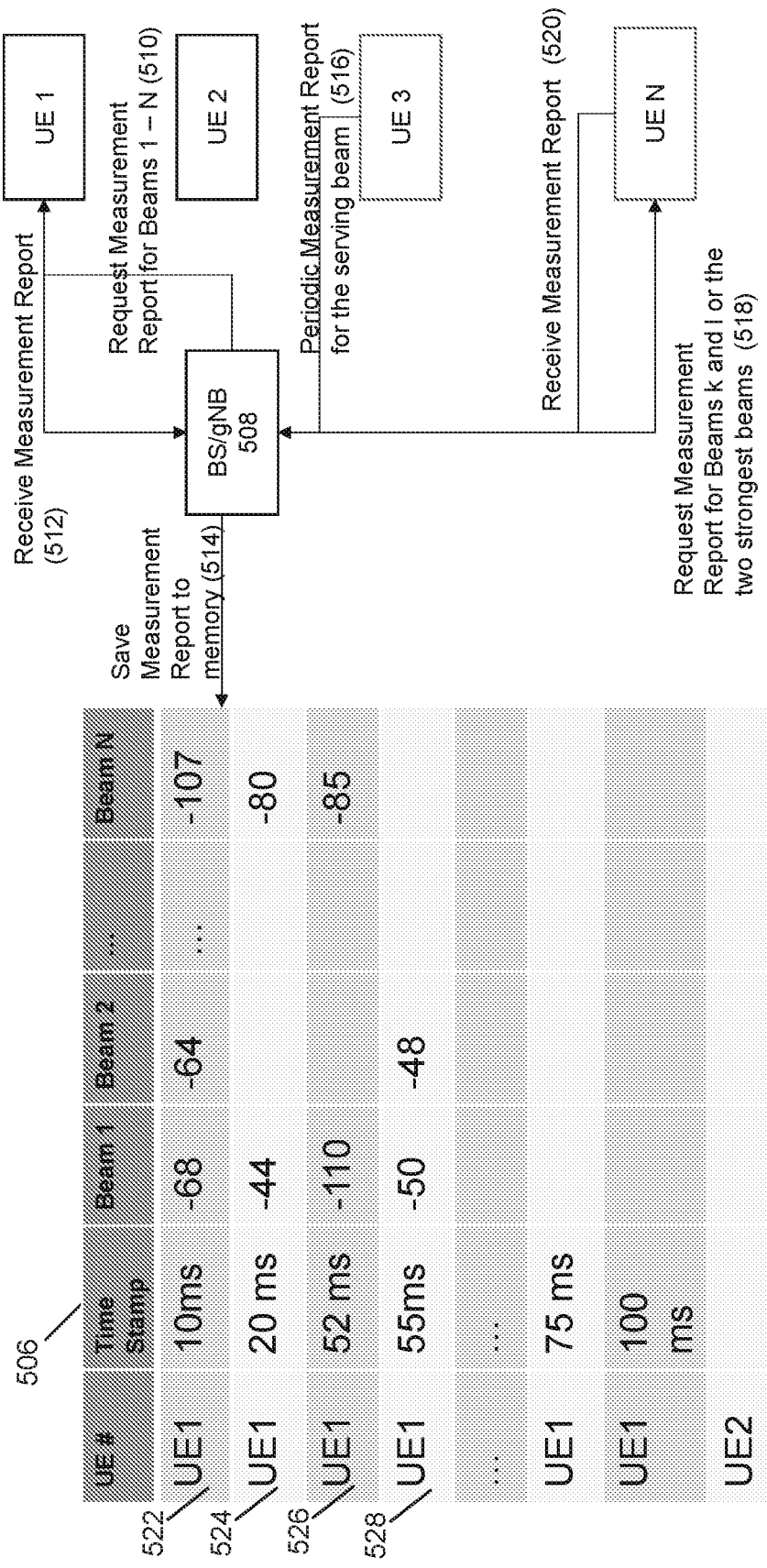
FIG. 5 is a diagram illustrating measurement and report collection according to an example embodiment.

FIG. 5 is a diagram illustrating measurement and report collection according to an example embodiment. As shown in FIG. 5, at 510, a BS 508 may send a request to UE1 a request for measurement report(s) for beams 1-N. At 512, the BS 508 may receive one or more measurement reports. At 514, the BS 508 may store the data from the received measurement reports from UE1 to its memory 506. The memory 506 of BS 508 may include (e.g., a table) that includes beam measurement data for one or more UEs, including from UE1, UE2, etc. With respect to measurement data received from UE1, data for a measurement report 522 indicates this data is for UE1, identifies a time stamp of 10 ms, and indicates a RSRP for various beams as: beam 1=−68 dBm; beam 2=−64 dBm; . . . beam n=−107 dBm. Thus, for the measurement report 522, the best or strongest beam for UE1 is beam 2 (with a RSRP of −64 dBm). BS 508 may also store in memory 506 data for measurement reports 524 (time stamp of 20 ms), 526 (time tamp of 52 ms), and 528 (time stamp 55 ms). The best or strongest beams indicated by measurement reports 524, 526 and 528 are beam 1 (RSRP=−

44 dBm), beam N (RSRP=−85 dBm) and beam 2 (RSRP=−48 dBm), respectively. Thus, in this illustrative example, a past beam sequence for UE1, based on the measurement reports 522-528, would be: 2, 1, N, 2, if the best beam is used to determine the past beam sequence. Alternatively, the serving beam, used by the BS or used by the UE, may be used to determine a past beam sequence for a UE. The serving beams (beams used by a UE or BS for communication) may often be the same as the best reported (e.g., highest RSRP) beams, but not necessarily. For instance, a best beam may not be used in some cases for one or more beam sampling intervals where a handover threshold has not yet been met to perform handover to a neighbor BS/TRP (and thus, the UE was not switched to the target BS yet).

As shown in FIG. 5, BS 508 may request and obtain measurement reports from other UEs, such as from UE2, UE3, etc. For example, at 516, UE3 may send a periodic measurement report to BS 508. Likewise at 518 and 520, BS 508 may request, and then receive, respectively, measurement reports for beams k and 1, or for the two best or strongest beams from UEN.

Figure 6:
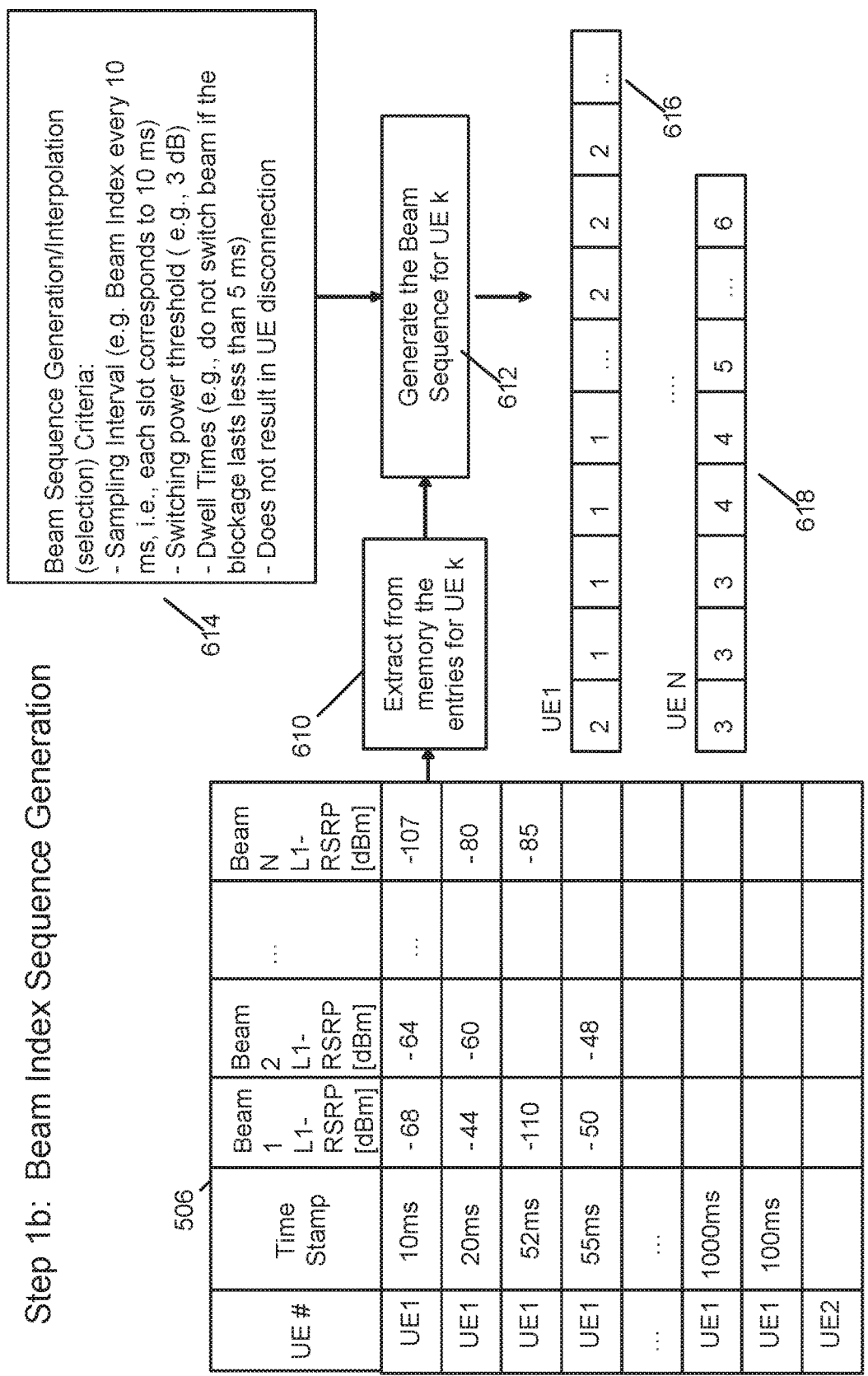
FIG. 6 is a diagram illustrating a beam sequence generation (or selection) according to an example embodiment.

FIG. 6 is a diagram illustrating a beam sequence generation (or selection) according to an example embodiment. As shown in FIG. 6, at 610, BS 508 may extract from memory the entries for UE k. At 612, the BS 508 may generate a beam sequence for UE k, which may include using one or more beam sequence generation or selection criteria, such as for example: the sampling interval used for beam selection, e.g., select the beam index with the highest measured RSRP each 10 ms interval; switching power threshold (e.g., 3 dB), for example, do not switch beams if the better beam RSRP or SINR (signal to noise ratio) is less than 3 dB better than the current beam RSRP or SINR; dwell times (e.g., do not switch beam if the blockage is less than 5 ms); and/or filter out or remove one or more beams that subsequently (e.g., within 20 ms) resulted in a UE disconnection or other undesirable performance.

Figure 7:
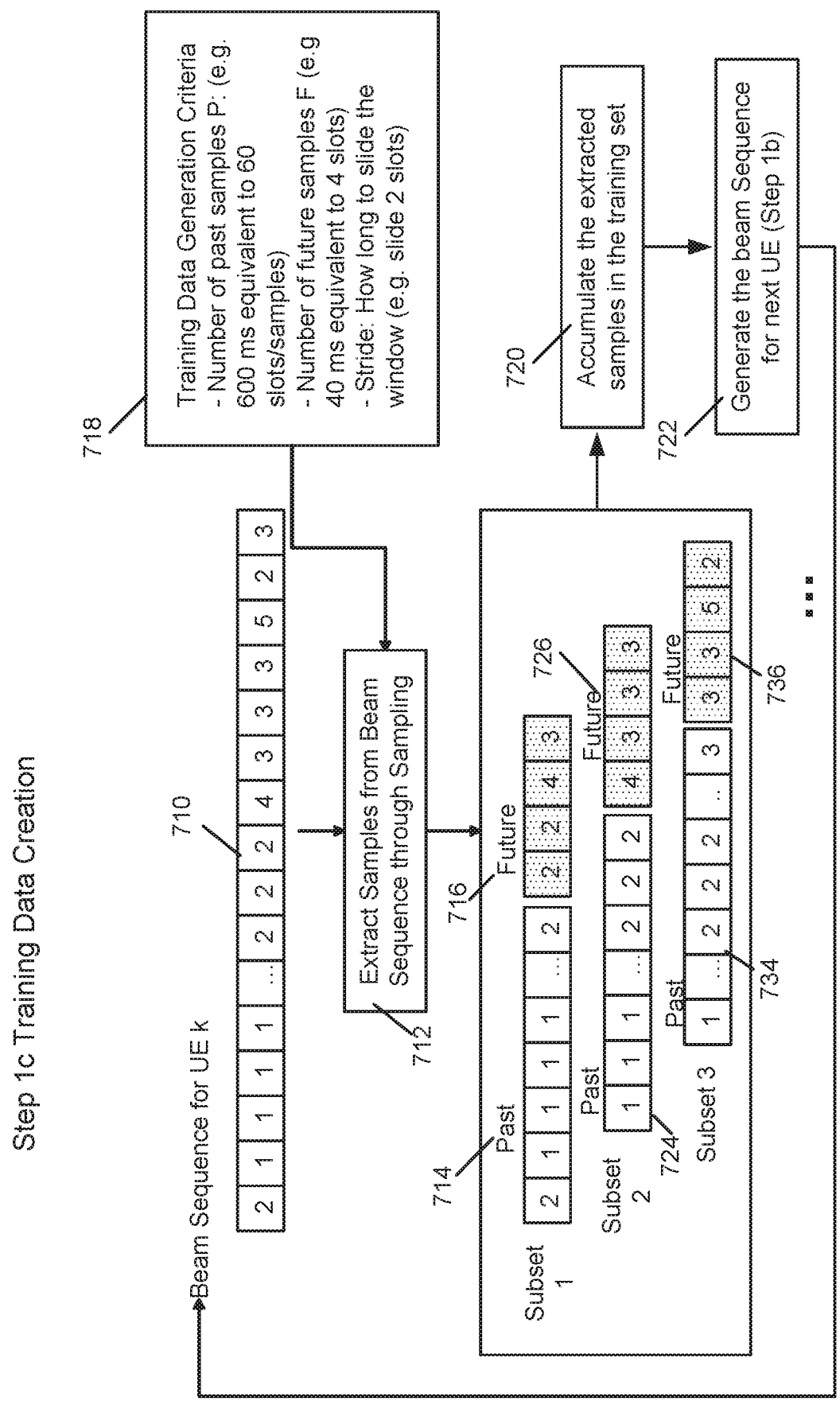
FIG. 7 is a diagram illustrating training data creation or generation according to an example embodiment.

FIG. 7 is a diagram illustrating training data creation or generation according to an example embodiment. After the data (e.g., beam sequence for UE k) has been generated as described in FIG. 6 (step 1b) to select a sequence of beams for a UE having a highest RSRP (or other signal parameter), based on measurement reports from the UE, and possibly applying other beam selection criteria (as described with respect to FIG. 6), further processing may be performed at step 1c (FIG. 7) to create or generate training data to be used in step 2 (see FIG. 8) to train the beam sequence model. For example, as shown in FIG. 7, a beam sequence 710 for UE k (e.g., output from step 1b) is provided. At 712, the BS (or other network entity) may extract samples from beam sequence 710 via sampling, e.g., sample the beam sequence every 10 ms. If the beam sequence 710 does not include a beam index for each 10 ms sampling interval, then the previous beam may be repeated, e.g., because this may mean the same beam was used for a period of time over multiple 10 ms intervals—thus having a dwell time (a contiguous period of time where a same beam was used, or was a best beam for a UE) for the beam greater than 10 ms interval.

According to an example embodiment, at 712, at step 1c (FIG. 7), the extraction of samples from the beam sequence 710 may be performed, in order to obtain training data for the beam sequence model, by separating or dividing a subset of the beam sequence into a first portion of past samples or beam indexes, and a second portion of future samples or beam indexes (which had time stamps that were subsequent in time to the samples/beams of the first portion of past samples). For example, for each subset (e.g., identified by the window) of the beam sequence 710, a first portion of past samples or beam indexes may be input for training the beam sequence model, and a second portion of future samples or beam indexes (which occurred, or have time stamps, subsequent in time to the first portion of past samples/indexes) may be used as the correct output of the beam sequence model for training. Thus, for each input or iteration, the output of the beam sequence model may be trained (e.g., weights of the neural network adjusted) to reduce the error between 1) the correct (or desired) output (which is the second portion of future samples/beam indexes), and the actual output of the beam sequence model. A window for the beam sequence, which may identify the samples/beam indexes that are the past and future samples of the beam sequence, may be adjusted (e.g., slid forward 1 or 2 slots or samples) and the process may be repeated.

According to an example embodiment, the extraction of samples from the beam sequence may be based on (one or more) training data generation criteria, such as, for example: 1) a number of past samples P (beam indexes of the beam sequence), e.g., 600 ms, which may be 60 samples or beam indexes to cover the 600 ms; 2) a number of future samples F (or future beam indexes, which occurred later in time from the past samples P, within the beam sequence), e.g., such as 40 ms or four 10 ms slots or samples; and 3) a stride for the sliding window to change the point that separates past samples P from future samples F, for each subset of the beam sequence.

According to an example embodiment, each beam sequence for UE k (and for multiple UEs), such as beam sequence 710, may be divided into a first portion of P past samples (P beam indexes) and a second portion (subsequent in time to the first portion of samples) of F future samples (or beam indexes). For example, for each subset of the beam sequence 710, the first portion of P past samples or beam indexes are input to the beam sequence model, and the second portion of F future samples may be used as a correct or desired output, in order to train the beam sequence model. For example, beam sequence 710 may have different subsets, including subset 1, subset 2, subset 3. Subset 1 may include a first portion 714 of P past samples (beam indexes 21111 . . . 2), and a second portion 716 of F future samples (beam indexes 2243). For example, P=60, and F=4, may be used in an illustrative example. Subset 2 may be obtained by sliding the window forward by 2 samples for the beam sequence 710. And, subset 3 may be obtained by sliding the window forward 2 more samples, as shown in FIG. 7. Thus, subset 2 may include a first portion (724) of P samples (beam indexes 111 . . . 222) and a second portion (726) of F future samples (beam indexes 4333). Subset 3 may include a first portion (734) of P samples (beam indexes 1 . . . 222 . . . 3) and a second portion (736) of F future samples (beam indexes 3352). Thus, each subset may have a slightly different first portion and second portion of samples (e.g., based on the location of the window), but all portions are from the same beam sequence 710. It should be noted that the beam indexes or samples in the beam sequence 710 for the UE have already occurred or were already indicated in measurement reports previously sent to the BS (e.g., based on measurement reports received from the UE, and/or based on beams actually used to communicate with the UE). However, the second portion of F samples (or beam indexes) of the beam sequence have a later or subsequent time stamp as compared to the samples or beam indexes in the first portion of P past samples. Hence, these later samples (F future samples) are referred to as future samples, and the earlier samples (P past samples) are referred to as past samples, for training purposes.

Referring to FIG. 7, at 720 the extracted samples, for various subsets for the UE, are accumulated, and may be provided to the beam sequence model for training. At 722, a beam sequence for another UE (UE k+1) is generated (step 1b), and then samples are extracted (step 1c) for UE k+1. Thus, beam sequences may be processed to extract training beam sequences for multiple UEs (step 1c), and these may be used for training the beam sequence model.

Figure 8:
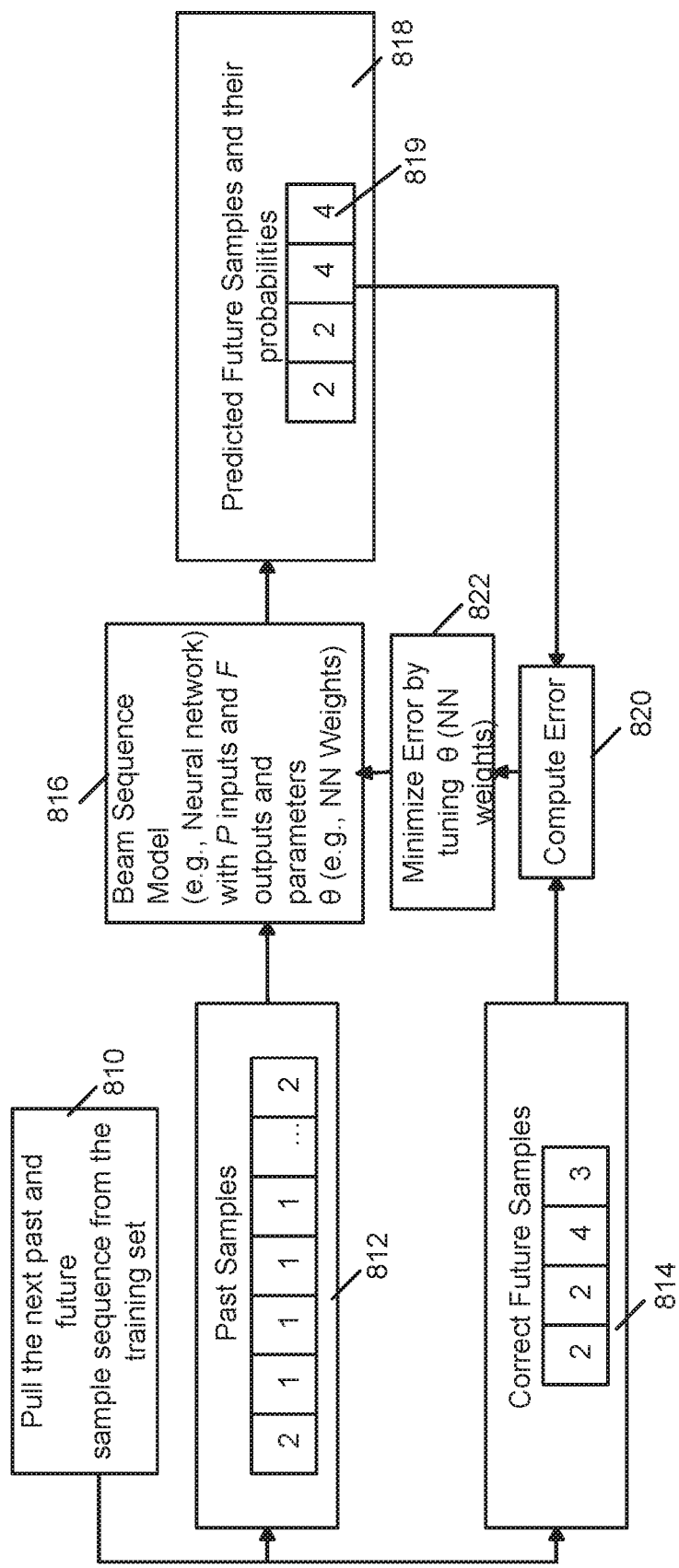
FIG. 8 is a diagram illustrating training of a beam sequence model for prediction according to an example embodiment.

FIG. 8 is a diagram illustrating training of a beam sequence model for prediction (step 2) according to an example embodiment. A beam sequence model 816 is provided and may be trained based on the samples or beam index sequences output or provided from step 1c, according to an illustrative example embodiment. Thus, at 810, the past samples 812 (which are a first portion of P past samples or beam indexes) and associated future samples (beam indexes) 814 (which is a second portion of F future samples or beam indexes) for a subset of a beam sequence for a UE are received. The past samples 812 (including beam indexes: 21111 . . . 2) are input to the beam sequence model 816. The beam sequence model 816 outputs a set of predicted future samples 818 (beam indexes) and their associated probabilities based on the inputs. In this illustrative example, the set of predicted future samples 818 includes the following four beam indexes: (2244). This set of predicted future samples 818 is compared (at 820) to the correct future samples 814, to compute an error. In this example, the correct future samples include the beam indexes (2243), while the predicted future samples include the beam indexes (2244). Thus, in this illustrative example, the last beam index or sample (819) of the predicted future samples 818, which indicates beam index 4, is incorrect, as it should be beam index 3. Thus, based on this error, at 822, one or more parameters of the beam sequence model 816, such as neural network weights, are tuned or adjusted to reduce or minimize the error. This process of tuning the beam sequence model based on a set of training samples (past and future) may be repeated for many (e.g., hundreds or even thousands of) training sets and/or for many UEs, in order to train (e.g., improve the prediction performance of) the beam sequence model 816 to provide an accurate (or more accurate) prediction.

Figure 9:
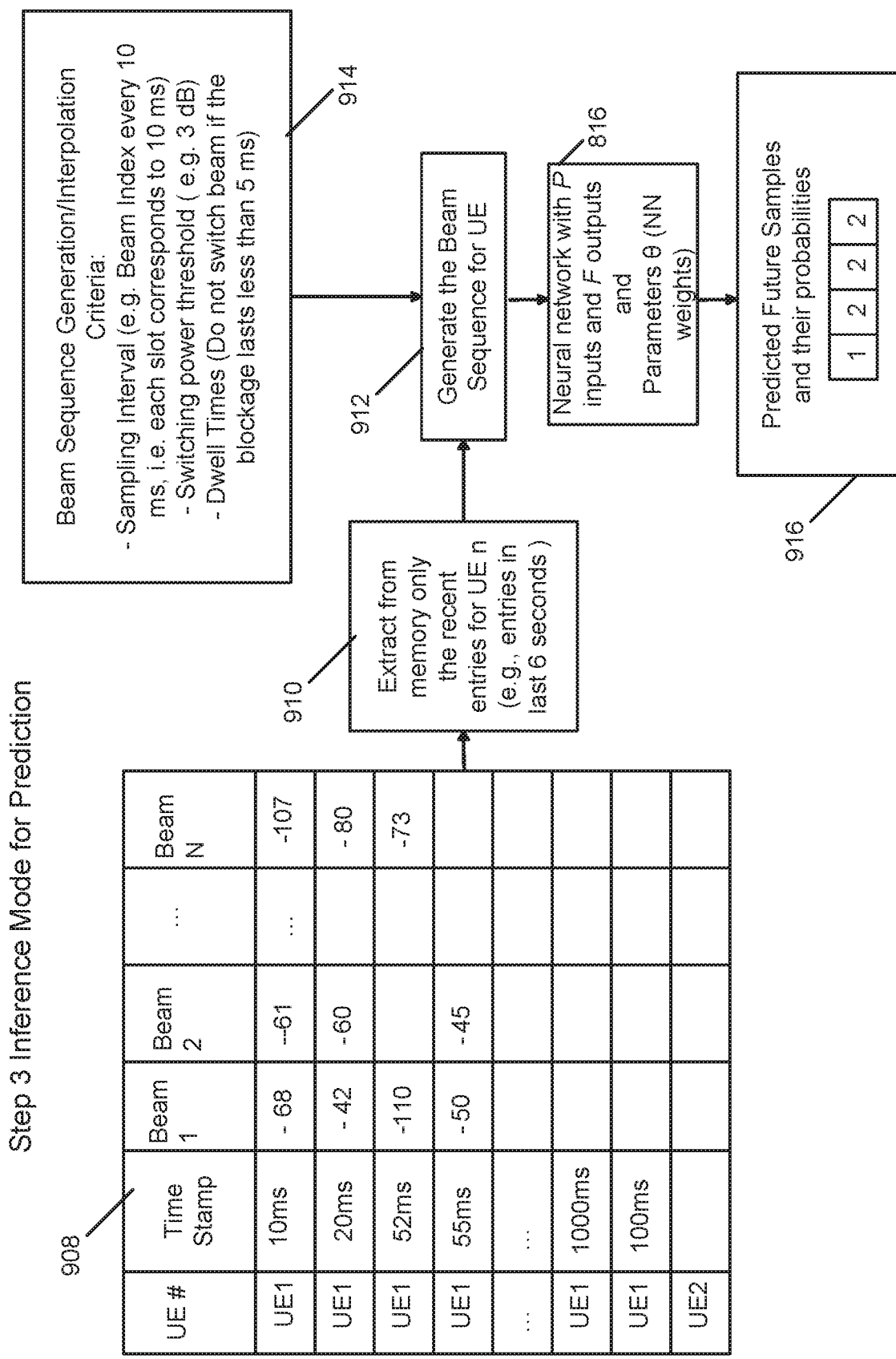
FIG. 9 is a diagram illustrating determining a predicted future beam sequence based on a past beam sequence and a beam sequence model according to an example embodiment.

FIG. 9 is a diagram illustrating determining a predicted future beam sequence based on a past beam sequence and a beam sequence model according to an example embodiment. Thus, as shown in FIG. 9, at step 2, a memory 908 of the BS may include data from measurement reports received from one or more UEs. The measurement data in memory 908 may indicate a UE, a time stamp, and a signal parameter (e.g., RSRP) for one or more measured beams. At 910, recent (e.g., the best beam indexes for the last 600 samples, over the last 6 seconds) may be read or extracted from memory. A beam sequence selection or generation criteria 914 may be applied to select all or at least some of these beam indexes or samples. Example beam sequence selection or generation criteria may include, e.g., a sampling interval (for example, determine one sample/beam index for every 10 ms interval); switching power threshold; dwell times, etc. At 912, a past beam sequence is generated (e.g., based on beam indexes/samples received from memory 908, and based on selection or generation criteria 914) for the UE, and is input to beam sequence model 816. Similar to what is shown in boxes 812, 816 and 818 of FIG. 8, the beam sequence model 816 (e.g., having been trained) outputs or determines a predicted future beam sequence based on the past beam sequence that is input to the beam sequence model 816. For example, as noted above, one or more beam-related actions may then be performed based on the predicted future beam sequence for the UE.

According to an example embodiment, the beam sequence model may be fed (as inputs) beam indexes of beams that served the UE and/or beams that were indicated in measurement reports as having a highest or best signal parameter (e.g., a sequence of beams that were indicated in UE measurement reports having a highest RSRP for the UE).

According to an example embodiment, a new deployed BS may initially be operated in a training mode. In the training mode, the BS may assign CSI-RS resources for reporting beam measurement reports from a wide set of beams. These reports are used directly to determine the best beam to serve the user during the training phase. The sequence of beams used by the UEs (and/or reported by UEs as the best beams) are captured and stored in memory during this process. Because there is no prediction during this training phase there may be some non-optimal sequences of beams, e.g., the best TRP/BS may be blocked soon after switching to that TRP/BS and radio link failures may occur. So, training data can be constructed by using the sequence of beam indexes with good measurement reports and suppressing intermediate beam indices with very poor signal strength and short dwell times, i.e., dwell times below a certain threshold. Dwell time may refer to the period of time that a UE used or reported a specific beam as a best or highest RSRP beam. For a past beam sequence for a UE, e.g., for training, the system or BS may select an actual beam sequence that served the UE/user for a given period without any outage or construct a training beam sequence from measurement reports ignoring beam switching triggered with a gain less than X dB threshold (e.g., omitting beams that offered less than a threshold gain) or followed within N ms with another switching (e.g., omitting beams having a dwell time less than N ms).

According to an example embodiment, training data (training sequence or training samples) may be constructed from these sequences of beam indices observed in the following way: Suppose that M beam training sequences of varying lengths across different users have been gathered using the procedure above, and that a goal or object of the system may be to predict from P past beam index samples the future F beam indices for any given UE. Thus, for example, each of the M beam sequences may be segmented into overlapping segments (or subsets, such as subsets or segments 1, 2, 3) with a sliding window of length P+F (e.g., see FIG. 7). The sliding window is slid by X beam indices along the sequence to create a new P+F length training segment. Overlapping segments or subsets increase the total number of segments or subsets available for training and also capture the correlation within a sequence. For training a Convolutional neural network (CNN) neural network model with fixed input length, if the beam sequence has length less than P+F, sequence may be removed from training data. When a Recursive neural network (RNN) neural network model is used, segments of varying length may be input to the neural network, and hence the sequences less than P+F should not be eliminated. A portion of each of the segments or subsets created is kept aside for testing the accuracy for prediction. For example, as noted with reference to FIG. 8, for training purposes for each beam sequence segment or subset, a first portion 812 of P past beam indices or samples may be used as input to the neural network or beam sequence model 816, and a corresponding second portion 814 of F future samples or beam indices of each of the segments or subsets may be used as a set of F correct future samples or beam indices. A set of F predicted future beam sequence 818 may then be compared to the correct F future samples 814, in order to compute an error. Weights or other parameters of the beam sequence model or neural network may be adjusted to reduce the error (e.g., see FIG. 8).

For example, one goal of the beam sequence model, e.g., which may be provided as a neural network such as a deep neural network, may include may be, for example, to predict the length F future sequence f with the length P input sequence. Standard back propagation training may be performed with a loss function measuring the disparity between the actual future sequence f with the predicted sequence f^. F^Minimum squared error (MSE) or cross entropy may be used, for example, as a loss function. In this manner, training of the beam sequence model or neural network, e.g., to minimize loss or error while tuning the parameters or weights of neural network (e.g., deep neural network, for example). The BS or system may also keep track of loss function validation set (subset of beam sequence segments not used for training or testing) to avoid overfitting. According to an example embodiment, the prediction accuracy may be tested using the test segments set aside and not included in the training. The accuracy may be given, for example, as the ratio of correct beam indices to the total length of predictions.

In inference (or prediction mode) in the field, a beam sequence (a past beam sequence) may be generated for a UE using the beam indices serving the UE in the past, or beam indices identified via UE measurement reports, which are then input to the beam sequence model or neural network to predict the next beam indices. These beam indices may be prioritized in L1-RSRP monitoring (e.g., beam indices input to the beam sequence model may use beams that were reported as having a highest RSRP for each of multiple sampling intervals, e.g., every 10 ms). If the predicted beam indices belong to a different BS/gNB, the handover process for the UE may be proactively be started or initiated before a signal or connection failure, e.g., if a next (or subsequent) predicted beam index in the predicted future beam sequence includes or identifies a beam that is provided by a different (target) BS/TRP.

Figure 10:
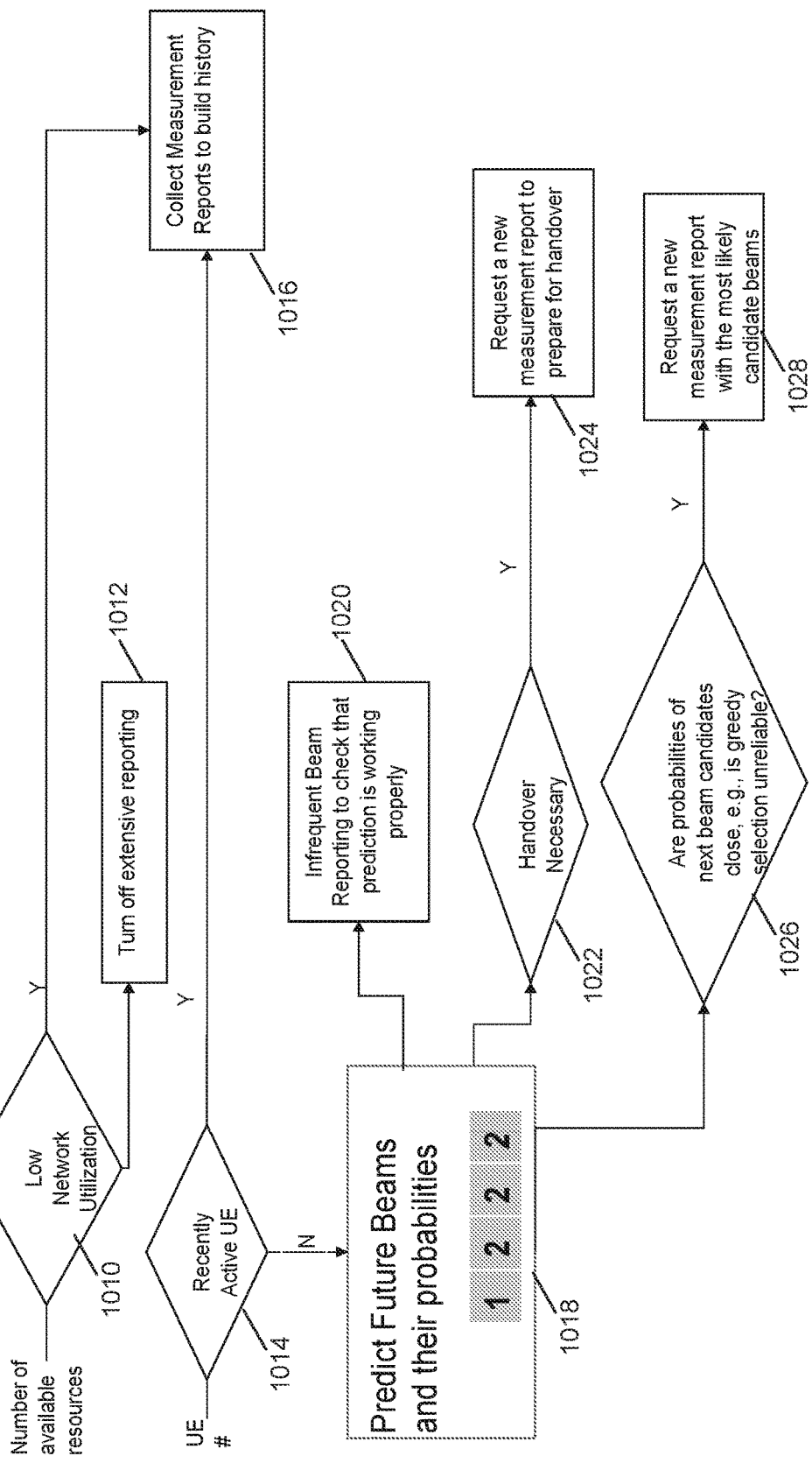
FIG. 10 is a flow chart illustrating some example beam-related actions according to an example embodiment.

As noted above, a BS/TRP may perform one or more beam-related actions, e.g., based on the predicted future beam sequence output from the beam sequence model. FIG. 10 is a flow chart illustrating some example beam-related actions according to an example embodiment. These actions may include turning on, turning off or adjusting a frequency or number of measurement reports.

There may be various triggering conditions for collection of measurement reports or UE measurement data for best beams, e.g., which may then be used for the prediction of the next beam or the next sequence of beams. As indicated before, there may be a training phase for a new deployed BS or TRP and beam RSRP measurement reports may be gathered or received by the TRP or BS during this training phase. Once the beam sequence model is trained, the TRP or BS in the operational (or prediction) mode may continuously run the prediction model to predict the next best beam (or next F beams) for each active UE/user and BS/TRP, e.g., in order to improve overall performance (by improving a selection of a beam for communication) between the UE and BS, and/or reduce beam-related overhead (e.g., reduce a number of beam measurements, and/or reduce the number or frequency of beam measurement reports requested and/or provided by UEs to the BS/TRP).

For example, at 1010, measurement reports can be triggered (1016) for retraining the beam sequence model during periods of low network utilization (1010) when resources are unused and available for sending extra measurement reports. At 1012, the BS may turn off (1012) extensive measurement reporting (e.g., decreasing frequency or number of measurement reports) when there is consistent or sufficient network utilization, and fewer resources are available for measurement reports (e.g., to reduce beam measurement overhead).

In the operational (or prediction) mode, the measurements may be triggered for various reasons, such as, for example: A UE just became active (1014) and so there is not enough history to run the prediction model. So for a period of time after the UE goes from Idle to Active, measurement reports may be triggered (1016) to build up the history. Although not shown in FIG. 10, the output from block 1016 may feed back into block 1014, as this may be a continuous process or repetitive. Likewise, the outputs of blocks 1020, 1024, and 1028 may each feed back into block 1018, as this may also be a continuous or repetitive process.

At 1020, the BS may set infrequent periodic beam reporting (with much less frequency than what would be required without the prediction) for each UE to ensure that the prediction is working correctly.

At 1022, the BS may determine if a handover for the UE is necessary.

If so, then the BS/TRP may request (1024) a new measurement report to prepare for handover (e.g., to select or confirm a best beam to which the BS will perform handover to). In particular, at 1024, the BS my request a measurement report for a specific set of (candidate) beams, to prepare for handover.

At 1026, the BS may determine if probability(ies) of a new beam candidate is below a threshold (e.g., less than 50%, or probabilities of the next two beams in the predicted future beam sequence are very close (thus, no clear best beam). Thus, in such a case, the BS may request a new measurement report with the most likely candidate beams, e.g., since the predicted future beam sequence does not provide a clear best beam. Instead of choosing in a greedy way the most likely beam, the neural network (beam sequence model) may output or provide the indices for most probable beams and the BS may trigger measurement reports for the beams that have probabilities above a threshold, i.e., when there is no single predicted beam index with high probability (1028).

The BS may also need to trigger extra measurement reports to enhance the beam prediction accuracy.

Figure 11:
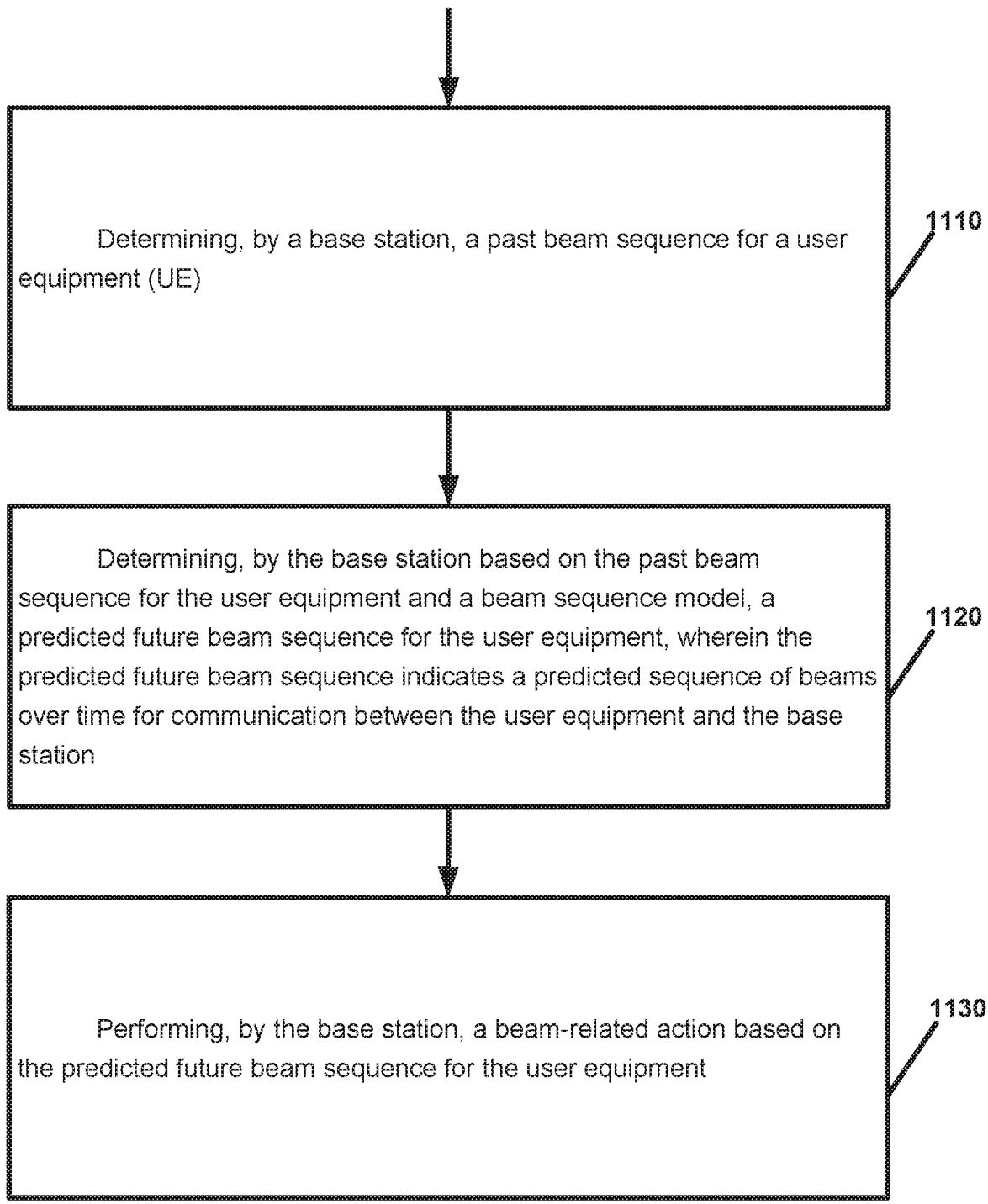
FIG. 11 is a flow chart illustrating operation of a system according to an example embodiment.

Example 1. FIG. 11 is a flow chart illustrating operation of a system (e.g., BS or TRP) according to an example embodiment. Operation 1110 includes determining, by a base station, a past beam sequence for a user equipment (UE). Operation 1120 includes determining, by the base station based on the past beam sequence for the user equipment and a beam sequence model, a predicted future beam sequence for the user equipment, wherein the predicted future beam sequence indicates a predicted sequence of beams over time for communication between the user equipment and the base station. And, operation 1130 includes performing, by the base station, a beam-related action based on the predicted future beam sequence for the user equipment.

Example 2. The method of Example 1, wherein performing the beam-related action comprises performing, by the base station, one or more of the following: changing, by the base station based on the predicted future beam sequence for the user equipment, a transmit beam used by the base station for downlink transmission to the user equipment; changing, by the base station based on the predicted future beam sequence for the user equipment, a receive beam used by the base station for uplink reception from the user equipment; changing, by the base station based on the predicted future beam sequence for the user equipment, one or more aspects of a beam measurement report to be provided by the user equipment to the base station; sending, by the base station to the user equipment, an updated report configuration to adjust a number of beams, or a number of associated reference signal resources, to be measured and reported by the user equipment within a beam measurement report; sending, by the base station to the user equipment, an updated report configuration to adjust a list of one or more specific beams, or adjust a list of one or more specific reference signal resources, to be measured and reported by the user equipment within a beam measurement report; sending, by the base station to the user equipment, an updated report configuration to adjust a number of beams or reference signal resources to be measured and reported by the user equipment within a beam measurement report; sending, by the base station to the user equipment, an updated report configuration to adjust a frequency of beam measurement reports to be sent by the user equipment to the base station; causing, by the base station, a handover of the user equipment to be performed from the base station to a target base station; causing, by the base station, a handover of the user equipment to be performed from the base station to a target base station based on a beam, which is associated with the target base station, indicated in the predicted future beam sequence for the user equipment; or sending, by the base station to the user equipment, a request for a beam measurement report.

Example 3. The method of any of Examples 1-2, wherein the beam sequence model comprises a neural network.

Example 4. The method of any of Examples 1-3, wherein the beam sequence model comprises a neural network, the method further comprising: training the beam sequence model based on a past beam sequence for one or more user equipments (UEs).

Example 5. The method of any of Examples 1-4, wherein the beam sequence model comprises a neural network, the method further comprising performing, by the base station, the following for one or more past beam sequences for one or more user equipments (UEs): determining a past beam sequence for a first user equipment (UE); determining a first portion of the past beam sequence for the first user equipment as an input to the beam sequence model during training; determining a second portion, subsequent in time to the first portion, of the past beam sequence for the first user equipment as a correct output of the beam sequence model during training; determining a predicted future beam sequence output, during training, from the beam sequence model based on the first portion of the past beam sequence as an input to the beam sequence model; determining an error of the beam sequence model based on a comparison between the correct output of the beam sequence model during training and the predicted future sequence output by the beam sequence model during training; and adjusting one or more weights of the beam sequence model to reduce the error.

Example 6. The method of any of Examples 1-5, wherein the predicted future beam sequence for the user equipment comprises a sequence of beam indexes, and a probability associated with each beam index, wherein each beam index identifies a beam.

Example 7. The method of any of Examples 1-6 wherein the past beam sequence for the user equipment comprises a plurality of beams, wherein each beam of the past beam sequence is determined from one or more of the following: a beam that was used by the base station, for one or more beam sampling intervals, to transmit signals to the user equipment or receive signals from the user equipment, and which did not result in a loss of connection between the base station and the user equipment; a beam that was used by the user equipment, for one or more beam sampling intervals, to transmit signals to the base station or receive signals from the base station, and which did not result in a loss of connection between the base station and the user equipment; a beam measurement report, received by the base station from the user equipment, indicating one or more beams measured by the user equipment with respect to the base station that have a highest signal measurement; or a beam or a set of beams, determined by the base station based on a set of reference signals received from the user equipment, that has a highest signal measurement, for one or more beam sampling intervals.

Example 8. The method of any of Examples 1-7, wherein performing the beam-related action comprises: changing, by the base station based on the predicted future beam sequence for the user equipment, one or more aspects of a beam measurement report to be provided by the user equipment to the base station, including at least one of: a number of beams, or a number of associated reference signal resources, to be measured and reported by the user equipment within a beam measurement report; a list of one or more specific beams, or a list of one or more specific reference signal resources, to be measured and reported by the user equipment within a beam measurement report; or a frequency of beam measurement reports to be sent by the user equipment to the base station.

Example 9. The method of any of Examples 1-8, wherein the base station comprises a first base station, the method further comprising: determining that a specific beam listed in the predicted future beam sequence for the user equipment is associated with or provided by a second base station that is different than the first base station; and wherein performing the beam-related action comprises performing, by the base station: causing, by the base station based on the specific beam being listed in the predicted future beam sequence for the user equipment, a handover of the user equipment from the first base station to the second base station.

Example 10. The method of any of Examples 1-9, wherein the base station is connected to both a first transmission reception point associated with a first cell and a second transmission reception point associated with a second cell, the method further comprising: determining that a first beam listed in the predicted future beam sequence for the user equipment is associated with the first transmission reception point; determining that a second beam listed in the predicted beam sequence, subsequent in time to the first beam, is associated with the second transmission reception point; wherein performing the beam-related action comprises performing, by the base station: causing, by the base station based on the first beam listed in the predicted future beam sequence being associated with the first transmission reception point, wireless communications to be performed between the user equipment and the first transmission reception point; and causing, by the base station based on the second beam listed in the predicted future beam sequence, a change or handover, for wireless communications for the UE, from the first transmission reception point to the second transmission reception point.

Example 11. The method of any of Examples 4-10, wherein the training the beam sequence model comprises training the beam sequence model based on at least one of: training the beam sequence model using supervised learning; training the beam sequence model using reinforcement learning; or training the beam sequence model using unsupervised learning.

Example 12. The method of any of Examples 1-11 wherein the past beam sequence for the user equipment comprises a plurality of beams, wherein each beam of the past beam sequence is determined based on a beam measurement report, received by the base station from the user equipment, indicating one or more beams measured by the user equipment with respect to the base station that have a highest signal measurement.

Example 13. The method of any of Examples 1-12 wherein the past beam sequence for the user equipment comprises a plurality of beams, wherein each beam of the past beam sequence is determined based on a beam or a set of beams, determined by the base station based on a set of reference signals received from the user equipment, that has a highest signal measurement, for one or more beam sampling intervals.

Example 14. The method of any of Examples 1-13 wherein the past beam sequence for the user equipment comprises a plurality of beams, wherein each beam of the past beam sequence is determined based on a beam that was used by either the base station or the user equipment for communication between the base station and the user equipment, for one or more beam sampling intervals, and which did not result in a loss of connection between the base station and the user equipment.

Example 15. The method of any of Examples 1-14, wherein the predicted future beam sequence indicates a predicted sequence of transmit beams over time for use by the base station to perform downlink transmission to the user equipment.

Example 16. The method of any of Examples 1-15, wherein the predicted future beam sequence indicates a predicted sequence of receive beams over time for use by the base station to perform uplink reception from the user equipment.

Example 17. An apparatus comprising means for performing the method of any of Examples 1-16.

Example 18. A non-transitory computer-readable storage medium comprising instructions stored thereon that, when executed by at least one processor, are configured to cause a computing system to perform the method of any of Examples 1-16.

Example 19. An apparatus comprising: at least one processor; and at least one memory including computer program code; the at least one memory and the computer program code configured to, with the at least one processor, cause the apparatus at least to perform the method of any of Examples 1-16.

Example 20. An apparatus comprising: at least one processor; and at least one memory including computer program code; the at least one memory and the computer program code configured to, with the at least one processor, cause the apparatus at least to: determine, by a base station, a past beam sequence for a user equipment (UE); determine, by the base station based on the past beam sequence for the user equipment and a beam sequence model, a predicted future beam sequence for the user equipment, wherein the predicted future beam sequence indicates a predicted sequence of beams over time for downlink transmission to the user equipment; and perform, by the base station, a beam-related action based on the predicted future beam sequence for the user equipment.

Example 21. The apparatus of Example 20, wherein causing the apparatus to perform the beam-related action comprises causing the apparatus to perform, by the base station, one or more of the following: change, by the base station based on the predicted future beam sequence for the user equipment, a transmit beam used by the base station for downlink transmission to the user equipment; change, by the base station based on the predicted future beam sequence for the user equipment, a receive beam used by the base station for uplink reception from the user equipment; change, by the base station based on the predicted future beam sequence for the user equipment, one or more aspects of a beam measurement report to be provided by the user equipment to the base station; send, by the base station to the user equipment, an updated report configuration to adjust a number of beams, or a number of associated reference signal resources, to be measured and reported by the user equipment within a beam measurement report; send, by the base station to the user equipment, an updated report configuration to adjust a list of one or more specific beams, or adjust a list of one or more specific reference signal resources, to be measured and reported by the user equipment within a beam measurement report; send, by the base station to the user equipment, an updated report configuration to adjust a number of beams or reference signal resources to be measured and reported by the user equipment within a beam measurement report; send, by the base station to the user equipment, an updated report configuration to adjust a frequency of beam measurement reports to be sent by the user equipment to the base station; cause, by the base station, a handover of the user equipment to be performed from the base station to a target base station; cause, by the base station, a handover of the user equipment to be performed from the base station to a target base station based on a beam, which is associated with the target base station, indicated in the predicted future beam sequence for the user equipment; or send, by the base station to the user equipment, a request for a beam measurement report.

Example 22. The apparatus of any of Examples 20-21, wherein the beam sequence model comprises a neural network.

Example 23. The apparatus of any of Examples 20-22, wherein the beam sequence model comprises a neural network, further causing the apparatus to: train the beam sequence model based on a past beam sequence for one or more user equipments (UEs).

Example 24. The apparatus of any of Examples 20-23, wherein the beam sequence model comprises a neural network, further causing the apparatus to perform, by the base station, the following for one or more past beam sequences for one or more user equipments (UEs): determine a past beam sequence for a first user equipment (UE); determine a first portion of the past beam sequence for the first user equipment as an input to the beam sequence model during training; determine a second portion, subsequent in time to the first portion, of the past beam sequence for the first user equipment as a correct output of the beam sequence model during training; determine a predicted future beam sequence output, during training, from the beam sequence model based on the first portion of the past beam sequence as an input to the beam sequence model; determine an error of the beam sequence model based on a comparison between the correct output of the beam sequence model during training and the predicted future sequence output by the beam sequence model during training; and adjust one or more weights of the beam sequence model to reduce the error.

Example 25. The apparatus of any of Examples 20-24, wherein the predicted future beam sequence for the user equipment comprises a sequence of beam indexes, and a probability associated with each beam index, wherein each beam index identifies a beam.

Example 26. The apparatus of any of Examples 20-25 wherein the past beam sequence for the user equipment comprises a plurality of beams, wherein each beam of the past beam sequence is determined from one or more of the following: a beam that was used by the base station, for one or more beam sampling intervals, to transmit signals to the user equipment or receive signals from the user equipment, and which did not result in a loss of connection between the base station and the user equipment; a beam that was used by the user equipment, for one or more beam sampling intervals, to transmit signals to the base station or receive signals from the base station, and which did not result in a loss of connection between the base station and the user equipment; a beam measurement report, received by the base station from the user equipment, indicating one or more beams measured by the user equipment with respect to the base station that have a highest signal measurement; or a beam or a set of beams, determined by the base station based on a set of reference signals received from the user equipment, that has a highest signal measurement, for one or more beam sampling intervals.

Example 27. The apparatus of any of Examples 20-26, wherein causing the apparatus to perform the beam-related action comprises causing the apparatus to: change, by the base station based on the predicted future beam sequence for the user equipment, one or more aspects of a beam measurement report to be provided by the user equipment to the base station, including at least one of: a number of beams, or a number of associated reference signal resources, to be measured and reported by the user equipment within a beam measurement report; a list of one or more specific beams, or a list of one or more specific reference signal resources, to be measured and reported by the user equipment within a beam measurement report; or a frequency of beam measurement reports to be sent by the user equipment to the base station.

Example 28. The apparatus of any of Examples 20-27, wherein the base station comprises a first base station, further causing the apparatus to: determine that a specific beam listed in the predicted future beam sequence for the user equipment is associated with or provided by a second base station that is different than the first base station; and wherein causing the apparatus to perform the beam-related action comprises causing the apparatus to: cause, by the base station based on the specific beam being listed in the predicted future beam sequence for the user equipment, a handover of the user equipment from the first base station to the second base station.

Example 29. The apparatus of any of Examples 20-28, wherein the base station is connected to both a first transmission reception point associated with a first cell and a second transmission reception point associated with a second cell, further causing the apparatus to: determine that a first beam listed in the predicted future beam sequence for the user equipment is associated with the first transmission reception point; determine that a second beam listed in the predicted beam sequence, subsequent in time to the first beam, is associated with the second transmission reception point; and wherein causing the apparatus to perform the beam-related action comprises causing the apparatus to perform: cause, by the base station based on the first beam listed in the predicted future beam sequence being associated with the first transmission reception point, wireless communications to be performed between the user equipment and the first transmission reception point; and cause, by the base station based on the second beam listed in the predicted future beam sequence, a change or handover, for wireless communications for the UE, from the first transmission reception point to the second transmission reception point.

Example 30. The apparatus of any of Examples 23-29, wherein causing the apparatus to train the beam sequence model comprises at least one of: cause the apparatus to train the beam sequence model using supervised learning; cause the apparatus to train the beam sequence model using reinforcement learning; or cause the apparatus to train the beam sequence model using unsupervised learning.

Example 31. The apparatus of any of Examples 20-30 wherein the past beam sequence for the user equipment comprises a plurality of beams, wherein each beam of the past beam sequence is determined based on a beam measurement report, received by the base station from the user equipment, indicating one or more beams measured by the user equipment with respect to the base station that have a highest signal measurement.

Example 32. The apparatus of any of Examples 20-31 wherein the past beam sequence for the user equipment comprises a plurality of beams, wherein each beam of the past beam sequence is determined based on a beam or a set of beams, determined by the base station based on a set of reference signals received from the user equipment, that has a highest signal measurement, for one or more beam sampling intervals.

Example 33. The apparatus of any of Examples 20-32 wherein the past beam sequence for the user equipment comprises a plurality of beams, wherein each beam of the past beam sequence is determined based on a beam that was used by either the base station or the user equipment for communication between the base station and the user equipment, for one or more beam sampling intervals, and which did not result in a loss of connection between the base station and the user equipment.

Example 34. The apparatus of any of Examples 20-33, wherein the predicted future beam sequence indicates a predicted sequence of transmit beams over time for use by the base station to perform downlink transmission to the user equipment.

Example 35. The apparatus of any of Examples 20-34, wherein the predicted future beam sequence indicates a predicted sequence of receive beams over time for use by the base station to perform uplink reception from the user equipment.

Figure 12:
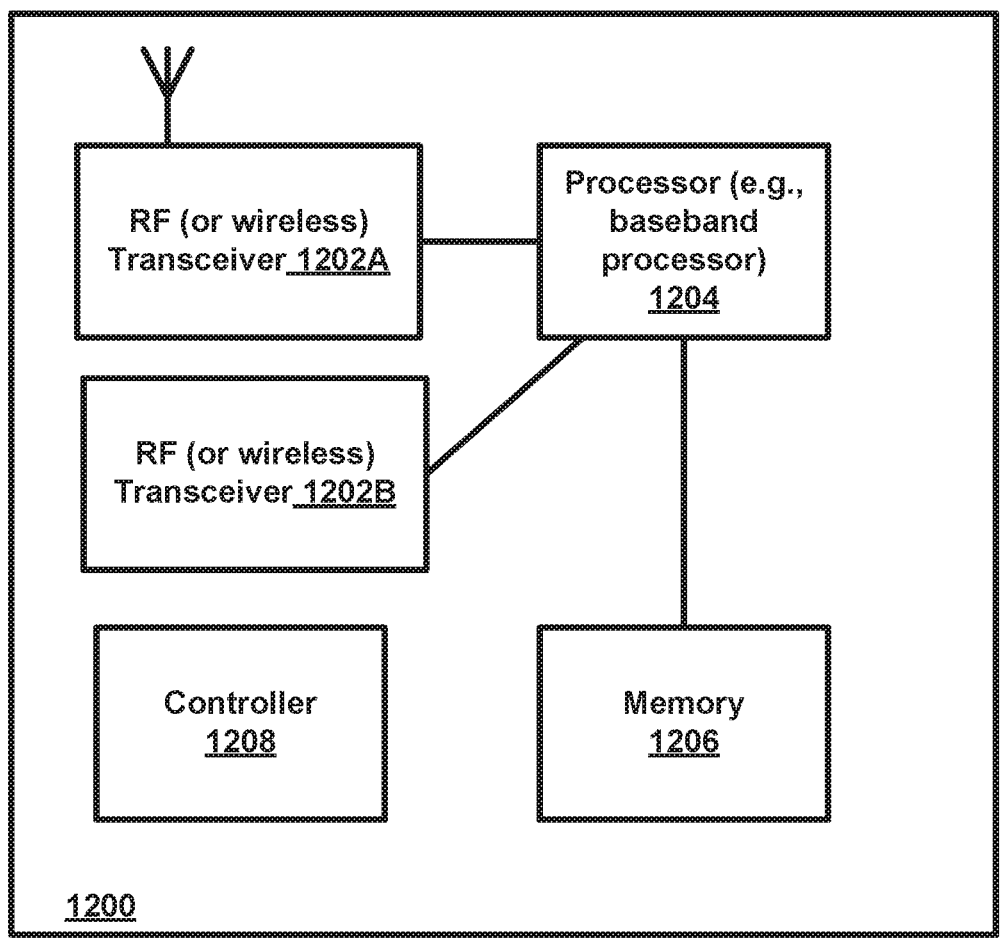
FIG. 12 is a block diagram of a wireless station (e.g., AP, BS, RAN node, UE or user device, or other network node) according to an example embodiment.

FIG. 12 is a block diagram of a wireless station (e.g., AP, BS or user device, or other network node) 1200 according to an example embodiment. The wireless station 1200 may include, for example, one or two RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 12, a controller (or processor) 1208 may execute software and instructions, and may provide overall control for the station 1200, and may provide control for other systems not shown in FIG. 12, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Embodiments of the various techniques described herein may be implemented in digital electronic circuitry, or in computer hardware, firmware, software, or in combinations of them. Embodiments may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
    at least one processor; and
    at least one memory including computer program code;
    the at least one memory and the computer program code configured to, with the at least one processor, cause the apparatus at least to:
    determine, by a base station, a past beam sequence for a user equipment (UE);
    determine a predicted future beam sequence output, during training, from a beam sequence model based on a first portion of the past beam sequence as an input to the beam sequence model and a second portion of the past beam sequence as a correct output;
    adjust one or more weights of the beam sequence model based on a comparison between the correct output and the predicted future beam sequence output;
    determine, by the base station based on the past beam sequence for the user equipment and the beam sequence model, a predicted future beam sequence for the user equipment, wherein the predicted future beam sequence indicates a predicted sequence of beams over time for downlink transmission to the user equipment; and
    perform, by the base station, a beam-related action based on the predicted future beam sequence for the user equipment.

2. The apparatus of claim 1, wherein the at least one processor and the computer program code configured to cause the apparatus to perform the beam-related action comprises the at least one processor and the computer program code configured to cause the apparatus to perform, by the base station, one or more of the following:
    change, by the base station based on the predicted future beam sequence for the user equipment, a transmit beam used by the base station for downlink transmission to the user equipment;
    change, by the base station based on the predicted future beam sequence for the user equipment, a receive beam used by the base station for uplink reception from the user equipment;
    change, by the base station based on the predicted future beam sequence for the user equipment, one or more aspects of a beam measurement report to be provided by the user equipment to the base station;
    send, by the base station to the user equipment, an updated report configuration to adjust a number of beams, or a number of associated reference signal resources, to be measured and reported by the user equipment within a beam measurement report;
    send, by the base station to the user equipment, an updated report configuration to adjust a list of one or more specific beams, or adjust a list of one or more specific reference signal resources, to be measured and reported by the user equipment within a beam measurement report;
    send, by the base station to the user equipment, an updated report configuration to adjust a number of beams or reference signal resources to be measured and reported by the user equipment within a beam measurement report;
    send, by the base station to the user equipment, an updated report configuration to adjust a frequency of beam measurement reports to be sent by the user equipment to the base station;
    cause, by the base station, a handover of the user equipment to be performed from the base station to a target base station;
    cause, by the base station, a handover of the user equipment to be performed from the base station to a target base station based on a beam, which is associated with the target base station, indicated in the predicted future beam sequence for the user equipment; or
    send, by the base station to the user equipment, a request for a beam measurement report.

3. The apparatus of claim 1, wherein the beam sequence model comprises a neural network.

4. The apparatus of claim 1, wherein the beam sequence model comprises a neural network, wherein the at least one processor and the computer program code are further configured to:
  train the beam sequence model based on a past beam sequence for one or more user equipments (UEs).

5. The apparatus of claim 1, wherein the predicted future beam sequence for the user equipment comprises a sequence of beam indexes, and a probability associated with each beam index, wherein each beam index identifies a beam.

6. The apparatus of claim 1 wherein the past beam sequence for the user equipment comprises a plurality of beams, wherein each beam of the past beam sequence is determined from one or more of the following:
  a beam that was used by the base station, for one or more beam sampling intervals, to transmit signals to the user equipment or receive signals from the user equipment, and which did not result in a loss of connection between the base station and the user equipment;
  a beam that was used by the user equipment, for one or more beam sampling intervals, to transmit signals to the base station or receive signals from the base station, and which did not result in a loss of connection between the base station and the user equipment;
  a beam measurement report, received by the base station from the user equipment, indicating one or more beams measured by the user equipment with respect to the base station that have a highest signal measurement; or
  a beam or a set of beams, determined by the base station based on a set of reference signals received from the user equipment, that has a highest signal measurement, for one or more beam sampling intervals.

7. The apparatus of claim 1, wherein the beam-related action comprises sending one or more measurement parameters comprising at least one of:
  a list of beams and associated reference signal resources to be measured and reported;
  a frequency of beam measurement reports to be sent to the base station; or
  a number of beams, or a number of associated reference signal resources, to be measured and reported by the user equipment within a beam measurement report.

8. The apparatus of claim 1, wherein the base station comprises a first base station, the at least one processor and the computer program code further configured to cause the apparatus to:
  determine that a specific beam listed in the predicted future beam sequence for the user equipment is associated with or provided by a second base station that is different than the first base station; and
  wherein the at least one processor and the computer program code configured to cause the apparatus to perform the beam-related action comprises the at least one processor and the computer program code configured to cause the apparatus to:
    cause, by the base station based on the specific beam being listed in the predicted future beam sequence for the user equipment, a handover of the user equipment from the first base station to the second base station.

9. The apparatus of claim 1, wherein the base station is connected to both a first transmission reception point associated with a first cell and a second transmission reception point associated with a second cell, the at least one processor and the computer program code further configured to cause the apparatus to:
  determine that a first beam listed in the predicted future beam sequence for the user equipment is associated with the first transmission reception point;
  determine that a second beam listed in the predicted future beam sequence, subsequent in time to the first beam, is associated with the second transmission reception point; and
  wherein the at least one processor and the computer program code configured to cause the apparatus to perform the beam-related action comprises the at least one processor and the computer program code configured to cause the apparatus to:
    cause, by the base station based on the first beam listed in the predicted future beam sequence being associated with the first transmission reception point, wireless communications to be performed between the user equipment and the first transmission reception point; and
    cause, by the base station based on the second beam listed in the predicted future beam sequence, a change or handover, for wireless communications for the UE, from the first transmission reception point to the second transmission reception point.

10. The apparatus of claim 4, wherein the at least one processor and the computer program code configured to cause the apparatus to train the beam sequence model comprises the at least one processor and the computer program code configured to cause the apparatus to perform at least one of:
  cause the apparatus to train the beam sequence model using supervised learning;
  cause the apparatus to train the beam sequence model using reinforcement learning; or
  cause the apparatus to train the beam sequence model using unsupervised learning.

11. The apparatus of claim 1, wherein the past beam sequence for the user equipment comprises a plurality of beams, wherein each beam of the past beam sequence is determined based on a beam measurement report, received by the base station from the user equipment, indicating one or more beams measured by the user equipment with respect to the base station that have a highest signal measurement.

12. The apparatus of claim 1, wherein the past beam sequence for the user equipment comprises a plurality of beams, wherein each beam of the past beam sequence is determined based on a beam or a set of beams, determined by the base station based on a set of reference signals received from the user equipment, that has a highest signal measurement, for one or more beam sampling intervals.

13. The apparatus of claim 1, wherein the past beam sequence for the user equipment comprises a plurality of beams, wherein each beam of the past beam sequence is determined based on a beam that was used by either the base station or the user equipment for communication between the base station and the user equipment, for one or more beam sampling intervals, and which did not result in a loss of connection between the base station and the user equipment.

14. The apparatus of claim 1, wherein the predicted future beam sequence indicates a predicted sequence of transmit beams over time for use by the base station to perform downlink transmission to the user equipment.

15. The apparatus of claim 1, wherein the predicted future beam sequence indicates a predicted sequence of receive beams over time for use by the base station to perform uplink reception from the user equipment.

16. A method comprising:

determining, by a base station, a past beam sequence for a user equipment (UE);

determining a predicted future beam sequence output, during training, from a beam sequence model based on a first portion of the past beam sequence as an input to the beam sequence model and a second portion of the past beam sequence as a correct output;

adjusting one or more weights of the beam sequence model based on a comparison between the correct output and the predicted future beam sequence output;

determining, by the base station based on the past beam sequence for the user equipment and the beam sequence model, a predicted future beam sequence for the user equipment, wherein the predicted future beam sequence indicates a predicted sequence of beams over time for communication between the user equipment and the base station; and performing, by the base station, a beam-related action based on the predicted future beam sequence for the user equipment.

17. The method of claim 16, wherein performing the beam-related action further comprises performing, by the base station, one or more of the following:

changing, by the base station based on the predicted future beam sequence for the user equipment, a transmit beam used by the base station for downlink transmission to the user equipment;

changing, by the base station based on the predicted future beam sequence for the user equipment, a receive beam used by the base station for uplink reception from the user equipment;

changing, by the base station based on the predicted future beam sequence for the user equipment, one or more aspects of a beam measurement report to be provided by the user equipment to the base station;

sending, by the base station to the user equipment, an updated report configuration to adjust a number of beams, or a number of associated reference signal resources, to be measured and reported by the user equipment within a beam measurement report;

causing, by the base station, a handover of the user equipment to be performed from the base station to a target base station;

causing, by the base station, a handover of the user equipment to be performed from the base station to a target base station based on a beam, which is associated with the target base station, indicated in the predicted future beam sequence for the user equipment; or sending, by the base station to the user equipment, a request for a beam measurement report.

18. The method of claim 16, wherein the beam sequence model comprises a neural network.

19. A non-transitory computer-readable storage medium comprising instructions stored thereon that, when executed by at least one processor, are configured to cause a computing system to perform the method of claim 16.

* * * * *